(12) United States Patent
Burdynska et al.

(10) Patent No.: US 11,667,772 B2
(45) Date of Patent: Jun. 6, 2023

(54) COMPOSITE ELECTROLYTES WITH BINDERS

(71) Applicant: Blue Current, Inc., Hayward, CA (US)

(72) Inventors: Joanna Burdynska, Berkeley, CA (US); Irune Villaluenga, Berkeley, CA (US); Kevin Wujcik, Berkeley, CA (US)

(73) Assignee: Blue Current, Inc., Hayward, CA (US)

( * ) Notice: Subject to any disclaimer, the term of this patent is extended or adjusted under 35 U.S.C. 154(b) by 0 days.

(21) Appl. No.: 17/129,290

(22) Filed: Dec. 21, 2020

(65) Prior Publication Data

US 2021/0194039 A1 Jun. 24, 2021

Related U.S. Application Data

(60) Provisional application No. 62/952,111, filed on Dec. 20, 2019.

(51) Int. Cl.
*C08L 9/02* (2006.01)
*C08L 31/04* (2006.01)
(Continued)

(52) U.S. Cl.
CPC ............. *C08L 9/02* (2013.01); *C08L 31/04* (2013.01); *H01M 10/056* (2013.01); *H01M 10/0525* (2013.01); *H01M 50/446* (2021.01); *C08K 2003/3009* (2013.01); *H01M 2300/0068* (2013.01); *H01M 2300/0091* (2013.01)

(58) Field of Classification Search
CPC ........................ H01M 10/056; H01M 50/446
See application file for complete search history.

(56) References Cited

U.S. PATENT DOCUMENTS 4,828,945 A    5/1989    Nagata et al.
4,879,073 A    11/1989    Kromrey
(Continued)

FOREIGN PATENT DOCUMENTS

CN    101983444 A    3/2011
CN    104779415 A    7/2015
(Continued)

OTHER PUBLICATIONS

Dey, A., et al., "Micro-Structural Effect on Hydroxy Terminated Poly Butadiene (HTPB) Prepolymer and HTPB Based Composite Propellant," Molecular Nanotechnology & Nanomedicine, vol. 1, Issue 1, 2017, pp. 1-7.
(Continued)

*Primary Examiner* — Nathanael T Zemui
(74) *Attorney, Agent, or Firm* — Weaver Austin Villeneuve & Sampson LLP

(57) ABSTRACT

Functionalized polymeric binders for electrolyte and electrode compositions include a polymer having a polymer backbone and functional groups. In some embodiments, a polymer includes a non-polar polymer backbone and a functional group that is 0.1 to 5 wt % of the polymer. In some embodiments, a polymer includes a polar backbone and a functional group that is 0.1 to 50% weight percent of the polymer. Also described are composites for electrolyte separators and electrodes that include argyrodite ion conductors and polar polymers.

26 Claims, 2 Drawing Sheets

| Current Collector 102 |
|---|
| Anode 104 |
| Electrolyte / Separator 106 |
| Cathode 108 |
| Current Collector 110 |

(51) Int. Cl.
   *H01M 50/446* (2021.01)
   *H01M 10/0525* (2010.01)
   *H01M 10/056* (2010.01)
   *C08K 3/30* (2006.01)

(56) References Cited

U.S. PATENT DOCUMENTS

| | | | |
|---|---|---|---|
| 4,929,388 A | 5/1990 | Wessling | |
| 4,985,317 A | 1/1991 | Adachi et al. | |
| 4,990,413 A | 2/1991 | Lee et al. | |
| 5,057,573 A | 10/1991 | Pascault | |
| 5,190,695 A | 3/1993 | Sotomura | |
| 5,217,827 A | 6/1993 | Fauteux | |
| 5,360,686 A | 11/1994 | Peled et al. | |
| 5,521,026 A | 5/1996 | Brochu et al. | |
| 5,529,707 A | 6/1996 | Kejha | |
| H1576 H | 8/1996 | Walker, Jr. et al. | |
| 5,563,103 A | 10/1996 | Komatsu | |
| 5,576,115 A | 11/1996 | Capuano et al. | |
| 5,599,355 A | 2/1997 | Nagasubramanian et al. | |
| 5,625,474 A | 4/1997 | Aomori et al. | |
| 5,631,103 A | 5/1997 | Eschbach et al. | |
| 5,695,873 A | 12/1997 | Kumar et al. | |
| 5,965,299 A | 10/1999 | Khan et al. | |
| 6,066,417 A | 5/2000 | Cho et al. | |
| 6,096,234 A | 8/2000 | Nakanishi et al. | |
| 6,190,806 B1 | 2/2001 | Kumar et al. | |
| 6,200,707 B1 | 3/2001 | Takada et al. | |
| 6,368,746 B1 | 4/2002 | Takada et al. | |
| 6,395,429 B1 | 5/2002 | Kang et al. | |
| 6,475,677 B1 | 11/2002 | Inda et al. | |
| 6,524,749 B1 | 2/2003 | Kaneda et al. | |
| 6,645,675 B1 | 11/2003 | Munshi | |
| 6,664,006 B1 | 12/2003 | Munshi | |
| 6,939,383 B2 | 9/2005 | Eastin et al. | |
| 7,799,467 B2 | 9/2010 | DeLongchamp et al. | |
| 7,824,795 B2 | 11/2010 | Yoshida et al. | |
| 7,993,782 B2 | 8/2011 | Takada et al. | |
| 8,182,943 B2 | 5/2012 | Visco et al. | |
| 8,895,194 B2 | 11/2014 | Shigeo et al. | |
| 8,951,678 B2 | 2/2015 | Jeong et al. | |
| 8,968,928 B2 | 3/2015 | Wang et al. | |
| 9,093,722 B2 | 7/2015 | Zhang et al. | |
| 9,153,840 B2 | 10/2015 | Saimen et al. | |
| 9,231,253 B2 | 1/2016 | Lee et al. | |
| 9,812,734 B2 | 11/2017 | Miyashita et al. | |
| 9,926,411 B1 | 3/2018 | Burdynska et al. | |
| 9,972,838 B2 | 5/2018 | Teran et al. | |
| 9,972,863 B2 | 5/2018 | Teran et al. | |
| 10,079,404 B1 | 9/2018 | Burdynska et al. | |
| 10,174,173 B2 | 1/2019 | Burdynska et al. | |
| 10,355,319 B1 | 7/2019 | Lim et al. | |
| 10,457,781 B2 | 10/2019 | Burdynska et al. | |
| 10,797,314 B2 | 10/2020 | Teran et al. | |
| 11,355,750 B2 | 6/2022 | Teran et al. | |
| 11,394,054 B2 | 7/2022 | Villaluenga et al. | |
| 11,394,064 B2 | 7/2022 | Honjo | |
| 11,572,459 B2 | 2/2023 | Burdynska et al. | |
| 11,581,570 B2 | 2/2023 | Burdynska et al. | |
| 2002/0185627 A1 | 12/2002 | Chen-Yang et al. | |
| 2006/0228608 A1 | 10/2006 | Chung et al. | |
| 2008/0138697 A1 | 6/2008 | Asada | |
| 2008/0166636 A1 | 7/2008 | Niitani et al. | |
| 2008/0248396 A1 | 10/2008 | Jung et al. | |
| 2008/0268346 A1 | 10/2008 | Inda | |
| 2009/0062434 A1 | 3/2009 | Chen et al. | |
| 2009/0081553 A1 | 3/2009 | Kondo et al. | |
| 2010/0055301 A1* | 3/2010 | Naoi | H01M 4/0404 427/77 |
| 2010/0151335 A1 | 6/2010 | Senga et al. | |
| 2011/0049745 A1 | 3/2011 | Katayama et al. | |
| 2011/0287305 A1 | 11/2011 | Scordilis-Kelley et al. | |
| 2012/0039824 A1 | 2/2012 | Archer et al. | |
| 2012/0177990 A1 | 7/2012 | Mitsuhashi et al. | |
| 2013/0040206 A1 | 2/2013 | Yoshida et al. | |
| 2013/0273421 A1 | 10/2013 | Matsumura et al. | |
| 2013/0289197 A1 | 10/2013 | Pavon Sierra et al. | |
| 2013/0309549 A1* | 11/2013 | Luski | H01M 10/0525 429/145 |
| 2014/0093785 A1 | 4/2014 | Sugiura et al. | |
| 2014/0162140 A1 | 6/2014 | Hoshiba et al. | |
| 2014/0170504 A1 | 6/2014 | Baek et al. | |
| 2014/0231706 A1 | 8/2014 | Cha et al. | |
| 2014/0234726 A1 | 8/2014 | Christensen et al. | |
| 2014/0255792 A1 | 9/2014 | Cao et al. | |
| 2015/0030933 A1 | 1/2015 | Goetzen et al. | |
| 2015/0102257 A1 | 4/2015 | Mullins et al. | |
| 2015/0147660 A1 | 5/2015 | Fujiki et al. | |
| 2015/0188187 A1 | 7/2015 | Strand et al. | |
| 2015/0255767 A1 | 9/2015 | Aetukuri et al. | |
| 2015/0288028 A1 | 10/2015 | DeSimone et al. | |
| 2015/0349377 A1 | 12/2015 | Sugiura et al. | |
| 2015/0349380 A1 | 12/2015 | Manthiram et al. | |
| 2015/0380739 A1 | 12/2015 | Watanabe et al. | |
| 2016/0013465 A1 | 1/2016 | Akiike | |
| 2016/0033918 A1 | 2/2016 | Taniguchi | |
| 2016/0049690 A1 | 2/2016 | Basak et al. | |
| 2016/0099470 A1 | 4/2016 | Kwon et al. | |
| 2016/0226097 A1 | 8/2016 | Wegner et al. | |
| 2016/0293946 A1 | 10/2016 | Ritter et al. | |
| 2017/0005367 A1 | 1/2017 | Van Berkel et al. | |
| 2017/0062830 A1 | 3/2017 | Bao et al. | |
| 2017/0062873 A1 | 3/2017 | Iyer et al. | |
| 2017/0133717 A1 | 5/2017 | Makino et al. | |
| 2017/0330699 A1 | 11/2017 | Buffry et al. | |
| 2017/0352916 A1 | 12/2017 | Miyashita et al. | |
| 2018/0034048 A1 | 2/2018 | Teran et al. | |
| 2018/0034061 A1 | 2/2018 | Teran et al. | |
| 2018/0034096 A1 | 2/2018 | Teran et al. | |
| 2018/0254513 A1* | 9/2018 | Burdynska | C08K 3/30 |
| 2018/0254518 A1 | 9/2018 | Burdynska et al. | |
| 2018/0261877 A1 | 9/2018 | Strand et al. | |
| 2018/0282486 A1 | 10/2018 | Burdynska et al. | |
| 2018/0351148 A1* | 12/2018 | Schneider | H01M 4/382 |
| 2019/0081353 A1* | 3/2019 | Iwata | H01B 1/12 |
| 2019/0135988 A1 | 5/2019 | Burdynska et al. | |
| 2019/0148769 A1 | 5/2019 | Aihara et al. | |
| 2019/0221879 A1 | 7/2019 | Safanama et al. | |
| 2019/0288319 A1 | 9/2019 | Kim | |
| 2019/0296393 A1 | 9/2019 | Watanabe | |
| 2019/0312304 A1 | 10/2019 | Uesugi et al. | |
| 2019/0334150 A1 | 10/2019 | Koh et al. | |
| 2019/0372160 A1* | 12/2019 | Makino | H01M 10/056 |
| 2020/0087155 A1 | 3/2020 | Rupert | |
| 2020/0099104 A1* | 3/2020 | Watanabe | H01M 10/0585 |
| 2020/0115505 A1 | 4/2020 | Burdynska et al. | |
| 2020/0168959 A1 | 5/2020 | Hettrich | |
| 2020/0203696 A1* | 6/2020 | Minamida | H01M 10/0562 |
| 2020/0220202 A1 | 7/2020 | Burdynska et al. | |
| 2020/0220210 A1* | 7/2020 | Makino | H01M 10/056 |
| 2021/0005889 A1 | 1/2021 | Teran et al. | |
| 2021/0047195 A1 | 2/2021 | Rupert | |
| 2021/0050620 A1 | 2/2021 | Rupert | |
| 2021/0057726 A1 | 2/2021 | Hoft et al. | |
| 2021/0167417 A1 | 6/2021 | Chao et al. | |
| 2021/0189105 A1 | 6/2021 | Burdynska et al. | |
| 2021/0194047 A1 | 6/2021 | Villaluenga et al. | |
| 2021/0313616 A1 | 10/2021 | Villaluenga et al. | |
| 2021/0389645 A1 | 12/2021 | Kim | |
| 2022/0021023 A1 | 1/2022 | Burdynska et al. | |
| 2022/0021079 A1 | 1/2022 | Villaluenga et al. | |
| 2022/0077493 A1* | 3/2022 | Oshima | H01M 10/0525 |
| 2022/0352565 A1 | 11/2022 | Wujcik et al. | |
| 2022/0367861 A1 | 11/2022 | Wujcik et al. | |
| 2022/0407057 A1 | 12/2022 | Teran et al. | |

FOREIGN PATENT DOCUMENTS

| | | |
|---|---|---|
| CN | 107403904 A | 11/2017 |
| CN | 111384456 A | 7/2020 |
| EP | 3 407 412 | 4/2021 |
| JP | 2003508886 A | 3/2003 |
| JP | 2010/106252 A | 5/2010 |
| JP | 2010186682 | 8/2010 |

(56) References Cited

FOREIGN PATENT DOCUMENTS

| JP | 2013033659 | | 2/2013 |
|---|---|---|---|
| JP | 2015191866 | A | 11/2015 |
| JP | 2018521173 | A | 8/2018 |
| JP | 2020068170 | A | 4/2020 |
| TW | 200400281 | A | 1/2004 |
| WO | WO2016/017525 | A1 | 2/2016 |
| WO | WO-2016129427 | A1 | 8/2016 |
| WO | WO-2017027395 | A1 | 2/2017 |
| WO | WO2018/023079 | | 2/2018 |
| WO | WO 2018/151161 | A1 | 8/2018 |
| WO | WO-2019119779 | A1 | 6/2019 |
| WO | WO 2020/252427 | | 12/2020 |
| WO | WO-2021183858 | A1 | 9/2021 |
| WO | WO-2022016194 | A1 | 1/2022 |

OTHER PUBLICATIONS

Manjari, R., et al., "Structure-Property Relationship of HTPB-Based Propellants. II Formulation Tailoring for Better Mechanical Properties," Journal of Applied Polymer Science, vol. 48, 1993, 279-289.
Nairn, K., et al., "Polymer-Ceramic Ion-Conducting Composites," Solid State Ionics, 86-88, 1996, pp. 589-593.
Santoro, M., et al., "High-Pressure Synthesis of a Polyethylene/zeolite Nano-Composite Material," Nature Communications, Published Mar. 5, 2013, 7 pages.
Sasuga, et al., "Liquid-Liquid Transition and Radiation-Induced Polymerization of Vinyl Acetate at High Pressure," Macromolecules, 1983, vol. 16, No. 4, pp. 545-548.
Hu, Qichao, "Electrode-Electrolyte Interfaces in Solid Polymer Lithium Batteries," Submitted to Harvard School of Engineering and Applied Sciences, May 1, 2012, 131 pages.
Villaluenga, et al., "Compliant glass-polymer hybrid single ion-conducting electrolytes for lithium batteries," PNAS Early Edition, 2015, pp. 1-6.
Inada, et al., "Fabrications and properties of composite solid-state electrolytes," Solid State Ionics, vol. 158, 2003, pp. 275-280.
Inada, et al., "Silicone as a binder in composite electrolytes," Journal of Power Sources, vol. 119-121, 2003, pp. 948-950.
Skaarup, et al., "Mixed phase solid electrolytes with nonconducting polymer binder," Solid State Ionics, vol. 40/41, 1990, pp. 1021-1024.
MacFarlane, D. R., et al., "Lithium-ion conducting ceramic/polyether composites," Electrochimica Acta, vol. 43, Nos. 10-11, pp. 1333-1337, 1998.
Chilaka et al., "Solid-state poly(ethylene glycol)polyurethane/polymethylmethacrylate/rutile TiO2 nanofiber composite electrolyte-correlation between morphology and conducting properties", Electrochimica Acta, vol. 62, Feb. 1, 2012 (Feb. 1, 2012), pp. 362-371, XP055127951, ISSN: 0013-4686, DOI: 10.1016/j.electacta.2011.12.052.
Shah et al., "Polymer Nanocomposites as Solid Electrolytes: Evaluating Ion-Polymerand PolymerNanoparticle Interactions in PEG-PU/PAN Semi-IPNs and Titania Systems", Journal of Physical Chemistry C, vol. 114, No. 33, Aug. 26, 2010 (Aug. 26, 2010), pp. 14281-14289, XP055127969, ISSN: 1932-7447, DOI: 10.1021/jp105450q.
Nasef et al. "Preparation of polymer electrolyte membranes for lithium batteries by radiationinduced graft copolymerization" Solid State Ionics. 2004, vol. 171, p. 243-249; p. 243, abstract, p. 244, left col. para 1.
Office Action dated Sep. 17, 2019, in U.S. Appl. No. 15/607,323.
Notice of Allowance dated Apr. 13, 2020 issued in U.S. Appl. No. 15/607,323.
Preliminary Amendment dated Sep. 24, 2020 for U.S. Appl. No. 16/946,974.
Notice of Allowance dated Aug. 23, 2017, in U.S. Appl. No. 15/607,328.
Notice of Allowance dated Feb. 16, 2018, in U.S. Appl. No. 15/607,328.
Office Action dated Aug. 25, 2017, in U.S. Appl. No. 15/607,336.
Notice of Allowance dated Jan. 4, 2018, 2018 in U.S. Appl. No. 15/607,336.
Office Action dated Nov. 28, 2017, in U.S. Appl. No. 15/662,102.
Notice of Allowance dated Jul. 19, 2018, in U.S. Appl. No. 15/662,102.
Office Action dated Sep. 18, 2017, in U.S. Appl. No. 15/662,116.
Notice of Allowance dated Jan. 22, 2018, in U.S. Appl. No. 15/662,116.
Office Action dated Aug. 27, 2018, in U.S. Appl. No. 15/936,221.
Notice of Allowance dated Nov. 9, 2018, in U.S. Appl. No. 15/936,221.
Notice of Allowance (corrected) dated Dec. 5, 2018, in U.S. Appl. No. 15/936,221.
Office Action dated May 29, 2019, in U.S. Appl. No. 15/936,221.
Notice of Allowance dated Sep. 5, 2019, in U.S. Appl. No. 16/240,257.
Office Action dated Apr. 28, 2021 in U.S. Appl. No. 17/129,277.
Office Action dated Oct. 15, 2020 in U.S. Appl. No. 16/241,784.
Office Action dated Jan. 13, 2021 in U.S. Appl. No. 16/814,756.
Invitation to Pay additional Fees dated Oct. 2, 2017, issued in Application No. PCT/US17/44530.
International Search Report and Written Opinion dated Dec. 12, 2017 issued in Application No. PCT/US17/44530.
International Search Report and Written Opinion dated May 15, 2018 issued in Application No. PCT/US18/20780.
International Preliminary Report on Patentability dated Sep. 12, 2019 issued in PCT/US2018/020780.
Extended European Search Report dated Feb. 25, 2020 issued in Application No. 17835391.8.
International Search Report and Written Opinion dated Mar. 24, 2020 issued in PCT/US2020/012409.
Extended European Search Report and Opinion dated Nov. 12, 2020 issued in Application No. 17835391.8.
Chinese Office Action dated Feb. 7, 2021 issued in Application No. 201880026321.5.
International Search Report and Written Opinion dated Mar. 17, 2021 issued in Application No. PCT/US2020/066180.
International Search Report and Written Opinion dated Mar. 17, 2021 issued in Application No. PCT/US2020/066189.
U.S. Appl. No. 16/814,756, filed Mar. 10, 2020, Villaluenga et al.
U.S. Appl. No. 17/129,277, filed Dec. 21, 2020, Burdynska et al.
Chinese Office Action dated Sep. 3, 2021 issued in Application No. 201780054522.1.
CN Office Action dated Oct. 18, 2021, in CN Application No. CN201880026321.5 with English translation.
International Search Report and Written Opinion dated Jun. 29, 2021 issued in PCT/US2021/025663.
Knauth, P. et al., "Inorganic Solid Li Ion Conductors: An Overview", Solid State Ionics, 2009, vol. 180, pp. 911-916.
Minafra et al., J. Mater. Chem. A, 2018, vol. 6, pp. 645-651 https://pubs.rsc.org/en/content/articlelanding/2017/ta/c7ta08581h/unauth#!divAbstract.
Minafra, N. et al., "Effect of Si Substitution On the Structural and Transport Properties of Superionic Li-argyrodites" Journal of Materials Chemistry A, 2018, vol. 6, pp. 645-651.
Minami, T. et al., "Recent Progress in Superionic Conducting Glasses", Journal of Non Crystalline Solids, 1987, vol. 95 &96, pp. 107-118.
Office Action dated Aug. 13, 2021 in U.S. Appl. No. 16/814,756.
Office Action dated Sep. 16, 2021 issued in U.S. Appl. No. 16/946,974.
Ribes, M. et al., "Sulfide Glasses: Glass Forming Region, Structure and Ionic Conduction of Glasses in Na2S-XS2 (X-Si; Ge), Na2S-P2S5 and Li2S-GeS2 Systems", Journal of Non-Crystalline Solids, vol. 38 & 39, 1980, pp. 271-276.
Tatsumisago, M. et al., "Preparation of Li3BO3-Li2SO4 Glass-ceramic Electrolytes for All-oxide Lithium Batteries", Journal of Power Sources, vol. 270, 2014, pp. 603-607.
U.S. Final Office Action dated Nov. 5, 2021 in U.S. Appl. No. 17/129,277.
U.S. Non-Final Office Action dated Apr. 28, 2021 in U.S. Appl. No. 17/129,277.

(56) References Cited

OTHER PUBLICATIONS

U.S. Appl. No. 17/304,645, Inventors Villaluenga et al., filed Jun. 23, 2021.
U.S. Appl. No. 17/304,646, Inventors Burdynska et al., filed Jun. 23, 2021.
Xu et al., A thermally healable polyhedral oligomeric silsesquioxane (POSS) nanocomposite based on Diels-Alder chemistry, Chem. Commun. 2013,49, 6755-6757.
Zhang, Z. et al., "Design and Synthesis of Room Temperature Stable Li-argyrodite Superionic Conductors via Cation Doping", Journal of Materials Chemistry A, 2019, vol. 7, pp. 2717-2722.
Zhao, Y. et al., "Superionic Conductivity In Lithium-rich Antiperovskites", Journal of the American Chemical Society, 2012, vol. 134, pp. 15042-15047.
English language translation for CN Application No. CN107403904A (Jun Haizu), 2017.
JP Office Action dated Feb. 1, 2022, in Application No. JP2019-547367.
L.R. Snyder., "Classification of the Solvent Properties of Common Liquids", Journal of Chromatography, 92, 1978, pp. 223-234.
U.S. Corrected Notice of Allowance dated May 10, 2022 in U.S. Appl. No. 16/946,974.
U.S. Non Final Office Action dated Jan. 27, 2022 in U.S. Appl. No. 16/241,784.
U.S. Non-Final Office Action dated May 12, 2022 in U.S. Appl. No. 17/129,277.
U.S. Notice of Allowance dated Feb. 1, 2022 in U.S. Appl. No. 16/946,974.
U.S. Notice of Allowance dated Mar. 15, 2022, in U.S. Appl. No. 16/814,756.
U.S. Requirement for Restriction dated Feb. 24, 2022 in U.S. Appl. No. 17/129,277.
U.S. Restriction Requirement dated Mar. 14, 2022, in U.S. Appl. No. 16/714,555.
Baoyun, L., "Molecular Weight, Molecular Weight Distribution and Bonding Strength of Adhesive", Organic Chemicals Engineering Technology, May 1982, vol. 1, No. 2, pp. 18-25.
CN Office Action dated Jun. 29, 2022, in CN Application No. CN201880026321.5 with English translation.
CN Office Action dated May 23, 2022, in Application No. CN201780054522.1 with English translation.
Doux, J. et al., "Pressure Effects on Sulfide Electrolytes for All Solid-state Batteries", Journal of Materials Chemistry A, 2020, vol. 8, pp. 5049-5055.
International Preliminary Report on Patentability dated Jun. 30, 2022, in PCT Application No. PCT/US2020/066180.
International Preliminary Report on Patentability dated Jun. 30, 2022, in PCT Application No. PCT/US2020/066189.
International Preliminary Report on Patentability dated Oct. 13, 2022, in PCT Application No. PCT/US2021/025663.
JP Office Action dated Aug. 30, 2022 in Application No. JP20190547367.
Manjun, H. et al., "High Polymer Physics", Fudan University Press, Oct. 1990, 182 pages.
U.S. Non-Final office Action dated Oct. 19, 2022 in U.S. Appl. No. 16/714,555.
U.S. Notice of Allowance dated Sep. 28, 2022 in U.S. Appl. No. 16/241,784.
U.S. Notice of Allowance dated Sep. 30, 2022 in U.S. Appl. No. 17/129,277.
U.S. Corrected Notice of Allowance dated Nov. 3, 2022 in U.S. Appl. No. 16/241,784.
U.S. Non-Final office Action dated Aug. 4, 2022 in U.S. Appl. No. 17/735,954.
U.S. Non-Final office Action dated Aug. 30, 2022 in U.S. Appl. No. 17/304,645.
U.S. Notice of Allowance dated Oct. 7, 2022 in U.S. Appl. No. 17/129,277.
U.S. Appl. No. 17/661,898, inventors Teran et al., filed May 3, 2022.
U.S. Appl. No. 17/808,295, inventors Villaluenga et al., filed Jun. 22, 2022.
Wang, M.J. et al., "Characterizing the Li-Solid-Electrolyte Interface Dynamics as a Function of Stack Pressure and Current Density", Joule, Sep. 18, 2019, vol. 3, pp. 2165-2178.
Yu. C, et al., "Revealing the relation between the structure, Li-ion conductivity and solid-state battery performance of the argyrodite Li6PS5Br solid electrolyte", Journal of Materials Chemistry A, 2017, vol. 5, pp. 21178-81188.
Zhang. J, et al., "All-solid-state batteries with slurry coated LiNiO.8CoO.1MnO.1O2 composite cathode and Li6PS5CI electrolyte: Effect of content", Journal of Power Sources 391, 2018 pp. 73-79.
U.S. Non-Final Office Action dated Mar. 8, 2021 in U.S. Appl. No. 16/829,962.
U.S. Non-Final Office Action dated Dec. 21, 2022 in U.S. Appl. No. 17/304,646.
U.S. Office Action dated Mar. 8, 2021 issued in U.S. Appl. No. 16/829,962.
U.S. Supplementary Notice of Allowance dated Jan. 9, 2023 in U.S. Appl. No. 17/129,277.
International Search Report and Written Opinion dated Jan. 23, 2023, in Application No. PCT/US2022/027510.
U.S. Final Office Action dated Mar. 8, 2023 in U.S. Appl. No. 17/735,954.
U.S. Notice of Allowance dated Jan. 17, 2023 in U.S. Appl. No. 16/241,784.

\* cited by examiner

COMPOSITE ELECTROLYTES WITH BINDERS

INCORPORATION BY REFERENCE

An Application Data Sheet is filed concurrently with this specification as part of the present application. Each application that the present application claims benefit of or priority to as identified in the concurrently filed Application Data Sheet is incorporated by reference herein in its entirety and for all purposes.

BACKGROUND

Solid-state electrolytes present various advantages over liquid electrolytes for primary and secondary batteries. For example, in lithium ion secondary batteries, inorganic solid-state electrolytes may be less flammable than conventional liquid organic electrolytes. Solid-state electrolytes can also faciliate use of a lithium metal electrode by resisting dendrite formation. Solid-state electrolytes may also present advantages of high energy densities, good cycling stabilities, and electrochemical stabilities over a range of conditions. However, there are various challenges in large scale commercialization of solid-state electrolytes. One challenge is maintaining contact between electrolyte and the electrodes. For example, while inorganic materials such as inorganic sulfide glasses and ceramics have high ionic conductivities (over 10-4 S/cm) at room temperature, they do not serve as efficient electrolytes due to poor adhesion to the electrode during battery cycling. Another challenge is that glass and ceramic solid-state conductors are too brittle to be processed into dense, thin films on a large scale. This can result in high bulk electrolyte resistance due to the films being too thick, as well as dendrite formation, due to the presence of voids that allow dendrite penetration. The mechanical properties of even relatively ductile sulfide glasses are not adequate to process the glasses into dense, thin films. Improving these mechanical properties without sacrificing ionic conductivity is a particular challenge, as techniques to improve adhesion, such as the addition of a solid polymer binder, tend to reduce ionic conductivity. It is not uncommon to observe more than an order of magnitude conductivity decrease with as little as 1 wt % of binder introduced. Solid-state polymer electrolyte systems may have improved mechanical characteristics that facilitate adhesion and formation into thin films, but have low ionic conductivity at room temperature or poor mechanical strength.

Materials that have high ionic conductivities at room temperature and that are sufficiently compliant to be processed into thin, dense films without sacrificing ionic conductivity are needed for large scale production and commercialization of solid-state batteries.

SUMMARY

One aspect of the disclosure relates to a composite including: inorganic ionically conductive particles; and an organic phase including a polymer binder, wherein the polymer binder includes a first polymer modified with functional groups, the functional groups being between 0.1 and 5 wt. % of the first polymer. In some embodiments, the first polymer is a non-polar polymer and the functional groups are polar groups. In some embodiments, the functional groups are selected from:

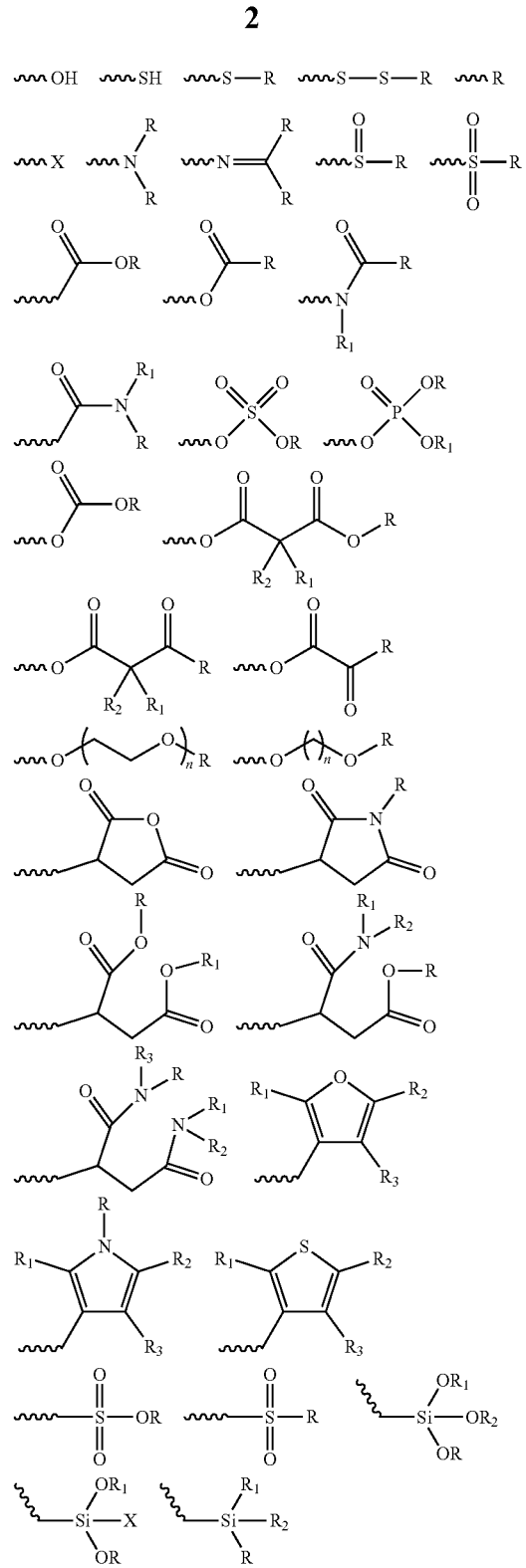

where $R, R_1, R_2, R_3$ are independently for each occurrence selected from —CN, —H, —OH, $Me^+$, —$OMe^+$, optionally substituted aryl, optionally substituted alkoxy, optionally substituted alkyl, optionally substituted alkenyl, and optionally substituted alkynyl; and X is independently for each occurrence selected from —F, —Cl, —Br, and —I; and n is an integer from 1 to 10.

In some embodiments, the first polymer is one of styrene-butadiene-styrene (SBS), styrene-isoprene-styrene (SIS), styrene-ethylene/propylene-styrene (SEPS), styrene-ethylene/butylene-styrene (SEBS), styrene butadiene rubber (SBR), ethylene propylene diene monomer (EPDM) rubber, polybutadiene (PBD), polyethylene (PE), polypropylene (PP), and polystyrene (PS).

In some embodiments, the polymer binder includes SEBS modified with maleic anhydride (SEBS-gMA). In some embodiments, the polymer binder includes SEBS modified with furfurylamine (SEBS-gFA).

In some embodiments, the polymer binder includes a mixture of the first polymer modified with functional groups and an unmodified first polymer.

Another aspect of the disclosure relates to a slurry including: a solvent; a polymer binder dissolved in the solvent, the polymer binder includes a first polymer modified with functional groups, the functional groups being between 0.1 and 5 wt. % of the first polymer; and ionically conductive sulfidic particles suspended in the solvent.

In some embodiments, the solvent has a polarity index of less than 3.5. In some embodiments, the solvent is halogenated and has a polarity index of higher than 3.5. In some embodiments, the first polymer is a non-polar polymer and the functional groups are polar groups. In some embodiments, the functional groups are selected from:

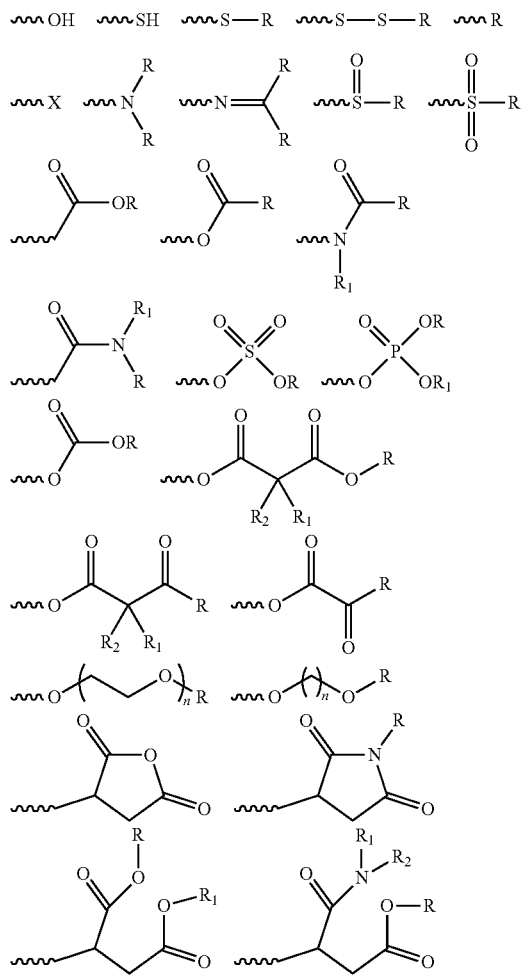

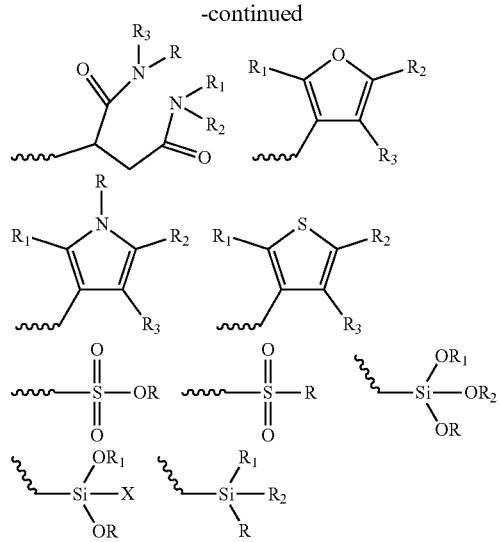

independently for each occurrence selected from —CN, —H, —OH, Me$^+$, —OMe$^+$, optionally substituted aryl, optionally substituted alkoxy, optionally substituted alkyl, optionally substituted alkenyl, and optionally substituted alkynyl; and X is independently for each occurrence selected from —F, —Cl, —Br, and —I; and n is an integer from 1 to 10.

In some embodiments, the first polymer is one of styrene-butadiene-styrene (SBS), styrene-isoprene-styrene (SIS), styrene-ethylene/propylene-styrene (SEPS), styrene-ethylene/butylene-styrene (SEBS), styrene butadiene rubber (SBR), ethylene propylene diene monomer (EPDM) rubber, polybutadiene (PBD), polyethylene (PE), polypropylene (PP), and polystyrene (PS). In some embodiments, the polymer binder includes SEBS modified with maleic anhydride (SEBS-gMA). In some embodiments, the polymer binder includes SEBS modified with furfurylamine (SEBS-gFA).

In some embodiments, the polymer binder includes a mixture of the first polymer modified with functional groups and an unmodified first polymer.

Another aspect of the disclosure relates to composite including: inorganic ionically conductive particles; and an organic phase including a polymer binder, wherein the polymer binder includes a first polymer modified with functional groups, the functional groups being between 0.1 and 50 wt. % of the first polymer. In some embodiments, the functional groups are between 5 and 50 wt. % of the first polymer.

In some embodiments, the first polymer unmodified is insoluble in solvents having polarity indexes below 4.5. In some such embodiments, the first polymer modified is soluble in the solvents having polarity indexes below 4.5. In some embodiments, the first polymer unmodified is insoluble in solvents having polarity indexes below 3.5. In some such embodiments, the first polymer modified is soluble in the solvents having polarity indexes below 3.5. In some embodiments, the first polymer is polyvinylidene fluoride (PVDF). In some embodiments, the polymer binder includes PVDF modified with styrene.

Another aspect of the disclosure relates to a slurry composition including: a solvent; a polymer binder dissolved in the solvent, the polymer binder includes a first polymer modified with functional groups, the functional groups being between 0.1 and 50 wt. % or 1 and 5 wt. % of the first polymer; and ionically conductive sulfidic particles suspended in the solvent. In some embodiments, the first polymer unmodified is insoluble in the solvent. In some such embodiments, the solvent has a polarity index below 4.5. In some such embodiments, the solvent has a polarity index below 3.5. In some embodiments, the first polymer is polyvinylidene fluoride (PVDF). In some embodiments, the polymer binder includes PVDF modified with styrene.

Another aspect of the disclosure relates to composite including: inorganic ionically conductive argyrodite-containing particles; and an organic phase including a polar polymer binder.

In some embodiments, the composite has an ionic conductivity of at least 0.2 mS·cm$^{-1}$ at 25° C., at least 0.25 mS·cm−1 at 25° C., or 0.3 mS·cm$^{-1}$ at 25° C. In some such embodiments, the inorganic ionically conductive argyrodite-containing particles are no more than 90 wt %, 85 wt %, or 80 wt % of the composite. In some embodiments, the composite has an ionic conductivity of at least 0.6 mS·cm$^{-1}$ at 25° C., at least 0.6 mS·cm−1 at 25° C., or 0.6 mS·cm$^{-1}$ at 25° C. In some such embodiments, the composite has an elongation at break of at least 10%, 15%, or 20%.

In some embodiments, the polymer binder is poly(vinylacetate) or nitrile butadiene rubber having up to 30% nitrile groups.

In some embodiments, the polymer binder is poly(acrylonitrile-co-styrene-co-butadiene) (ABS), poly(ethylene-co-vinylacetate), poly(styrene-co-acrylonitrile) (SAN), poly(styrene-co-maleic anhydride), poly(meth)acrylates, poly(alkyene glycols), poly(butadiene-co-acrylate), poly(butadiene-co-acrylic acid-co-acrylonitrile), Poly(ethylene-co-acrylates), polyethers, polyesters of dialkyl phthalates, or poly(vinyl chloride) (PVC).

In some embodiments, the polymer binder includes a first polymer modified with functional groups, the functional groups being between 0.1 and 5 wt. % of the first polymer.

In some embodiments, the polymer binder includes a first polymer modified with functional groups, the functional groups being between 0.1 and 50 wt. % of the first polymer. In some such embodiments, the first polymer unmodified is insoluble in solvents having polarity indexes below 3.5. In some embodiments, the first polymer modified is soluble in the solvents having polarity indexes below 3.5.

In some embodiments, the argyrodite has the formula $Li_{7-x}PS_{6-x}X_x$ (X=Cl, Br, I, and 0<x<2). In some such embodiments, X is greater than 1.

Another aspect of the disclosure relates to a composite including: inorganic ionically conductive argyrodite-containing particles; and an organic phase including a polar polymer binder. In some embodiments, the polar polymer binder is poly(vinylacetate) or nitrile butadiene rubber having up to 30% nitrile groups.

In some embodiments, is poly(acrylonitrile-co-styrene-co-butadiene) (ABS), poly(ethylene-co-vinylacetate), poly(styrene-co-acrylonitrile) (SAN), poly(styrene-co-maleic anhydride), poly(meth)acrylates, poly(alkyene glycols), poly(butadiene-co-acrylate), poly(butadiene-co-acrylic acid-co-acrylonitrile), poly(ethylene-co-acrylates), polyethers, polyesters of dialkyl phthalates, or poly(vinyl chloride) (PVC).

In some embodiments, the polymer binder includes a first polymer modified with functional groups, the functional groups being between 0.1 and 5 wt. % of the first polymer.

In some embodiments, the polymer binder includes a first polymer modified with functional groups, the functional groups being between 0.1 and 50 wt. % of the first polymer.

In some such embodiments, the first polymer unmodified is insoluble in solvents having polarity indexes below 3.5. In some such embodiments, the first polymer modified is soluble in the solvents having polarity indexes below 3.5.

These and other aspects are described further below.

DESCRIPTION

Figure 1A:
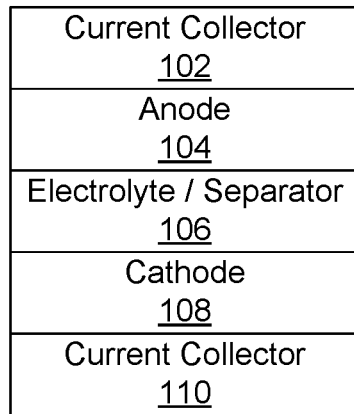
FIGS. 1A-1C show schematic examples of cells according to various embodiments.

Provided herein are ionically conductive composite electrolytes that have an ionically-conductive inorganic phase and an organic phase. The composites are single-ion conductors with good electrochemical stability and room temperature conductivities. The organic phase includes a polymeric binder that provides sufficient mechanical properties that enable processing and incorporation in all-solid-state batteries. The composite electrolytes can also provide high elasticity, bendability, and mechanical strength that may be needed for devices such as flexible electronics that are exposed to significant stresses during operation.

The term "number average molecular weight" or "Mn" in reference to a particular component (e.g., a high molecular weight polymer binder) of a solid-state composition refers to the statistical average molecular weight of all molecules of the component expressed in units of g/mol. The number average molecular weight may be determined by techniques known in the art such as, for example, gel permeation chromatography (wherein Mn can be calculated based on known standards based on an online detection system such as a refractive index, ultraviolet, or other detector), viscometry, mass spectrometry, or colligative methods (e.g., vapor pressure osmometry, end-group determination, or proton NMR). The number average molecular weight is defined by the equation below, $$M_n = \frac{\sum N_i M_i}{\sum N_i}$$

wherein Mi is the molecular weight of a molecule and Ni is the number of molecules of that molecular weight. In the description below, references to molecular weights of particular polymers refer to number average molecular weight.

The term "alkyl" as used herein alone or as part of another group, refers to a straight or branched chain hydrocarbon containing any number of carbon atoms and that include no double or triple bonds in the main chain. "Lower alkyl" as used herein, is a subset of alkyl and refers to a straight or branched chain hydrocarbon group containing from 1 to 6 carbon atoms. The terms "alkyl" and "lower alkyl" include both substituted and unsubstituted alkyl or lower alkyl unless otherwise indicated. Examples of lower alkyl include methyl, ethyl, n-propyl, iso-propyl, n-butyl, iso-butyl, tert-butyl, and the like.

The alkyl group can also be substituted or unsubstituted. For example, the alkyl group can be substituted with one, two, three or, in the case of alkyl groups of two carbons or more, four substituents independently selected from the group consisting of: (1) $C_{1-6}$ alkoxy (e.g., —O-Ak, wherein Ak is optionally substituted $C_{1-6}$ alkyl); (2) $C_{1-6}$ alkylsulfinyl (e.g., —S(O)-Ak, wherein Ak is optionally substituted $C_{1-6}$ alkyl); (3) $C_{1-6}$ alkylsulfonyl (e.g., —SO$_2$-Ak, wherein Ak is optionally substituted $C_{1-6}$ alkyl); (4) amino (e.g., —NR$^{N1}$R$^{N2}$, where each of R$^{N1}$ and R$^{N2}$ is, independently, H or optionally substituted alkyl, or R$^{N1}$ and R$^{N2}$, taken together with the nitrogen atom to which each are attached, form a heterocyclyl group); (5) aryl; (6) arylalkoxy (e.g., —O-L-Ar, wherein L is a bivalent form of optionally substituted alkyl and Ar is optionally substituted aryl); (7) aryloyl (e.g., —C(O)—Ar, wherein Ar is optionally substituted aryl); (8) azido (e.g., —N=N—); (9) cyano (e.g., —CN); (10) carboxyaldehyde (e.g., —C(O)H); (11) $C_{3-8}$ cycloalkyl (e.g., a monovalent saturated or unsaturated non-aromatic cyclic $C_{3-8}$ hydrocarbon group); (12) halo (e.g., F, Cl, Br, or I); (13) heterocyclyl (e.g., a 5-, 6- or 7-membered ring, unless otherwise specified, containing one, two, three, or four non-carbon heteroatoms, such as nitrogen, oxygen, phosphorous, sulfur, or halo); (14) heterocyclyloxy (e.g., —O-Het, wherein Het is heterocyclyl, as described herein); (15) heterocyclyloyl (e.g., —C(O)—Het, wherein Het is heterocyclyl, as described herein); (16) hydroxyl (e.g., —OH); (17)N-protected amino; (18) nitro (e.g., —NO$_2$); (19) oxo (e.g., =O); (20) $C_{3-8}$ spirocyclyl (e.g., an alkylene or heteroalkylene diradical, both ends of which are bonded to the same carbon atom of the parent group); (21) $C_{1-6}$ thioalkoxy (e.g., —S-Ak, wherein Ak is optionally substituted $C_{1-6}$ alkyl); (22) thiol (e.g., —SH); (23) —CO$_2$R$^A$, where R$^A$ is selected from the group consisting of (a) hydrogen, (b) $C_{1-6}$ alkyl, (c) $C_{4-18}$ aryl, and (d) ($C_{4-18}$ aryl) $C_{1-6}$ alkyl (e.g., -L-Ar, wherein L is a bivalent form of optionally substituted alkyl group and Ar is optionally substituted aryl); (24) —C(O)NR$^B$R$^C$, where each of R$^B$ and Rc is, independently, selected from the group consisting of (a) hydrogen, (b) $C_{1-6}$ alkyl, (c) $C_{4-18}$ aryl, and (d) ($C_{4-18}$ aryl) $C_{1-6}$ alkyl (e.g., -L-Ar, wherein L is a bivalent form of optionally substituted alkyl group and Ar is optionally substituted aryl); (25) —SO$_2$RD, where RD is selected from the group consisting of (a) $C_{1-6}$ alkyl, (b) $C_{4-18}$ aryl, and (c) ($C_{4-18}$ aryl) $C_{1-6}$ alkyl (e.g., -L-Ar, wherein L is a bivalent form of optionally substituted alkyl group and Ar is optionally substituted aryl); (26) —SO$_2$NR$^E$R$^F$, where each of R$^E$ and R$^F$ is, independently, selected from the group consisting of (a) hydrogen, (b) $C_{1-6}$ alkyl, (c) $C_{4-18}$ aryl, and (d) ($C_{4-18}$ aryl) $C_{1-6}$ alkyl (e.g., -L-Ar, wherein L is a bivalent form of optionally substituted alkyl group and Ar is optionally substituted aryl); and (27) —NR$^G$R$^H$, where each of R$^G$ and R$^H$ is, independently, selected from the group consisting of (a) hydrogen, (b) an N-protecting group, (c) $C_{1-6}$ alkyl, (d) $C_{2-6}$ alkenyl (e.g., optionally substituted alkyl having one or more double bonds), (e) $C_{2-6}$ alkynyl (e.g., optionally substituted alkyl having one or more triple bonds), (f) $C_{4-18}$ aryl, (g) ($C_{4-18}$ aryl) $C_{1-6}$ alkyl (e.g., L-Ar, wherein L is a bivalent form of optionally substituted alkyl group and Ar is optionally substituted aryl), (h) $C_{3-8}$ cycloalkyl, and (i) ($C_{3-8}$ cycloalkyl) $C_{1-6}$ alkyl (e.g., -L-Cy, wherein L is a bivalent form of optionally substituted alkyl group and Cy is optionally substituted cycloalkyl, as described herein), wherein in one embodiment no two groups are bound to the nitrogen atom through a carbonyl group or a sulfonyl group. The alkyl group can be a primary, secondary, or tertiary alkyl group substituted with one or more substituents (e.g., one or more halo or alkoxy). In some embodiments, the unsubstituted alkyl group is a $C_{1-3}$, $C_{1-6}$, $C_{1-12}$, $C_{1-16}$, $C_{1-18}$, $C_{1-20}$, or $C_{1-24}$ alkyl group.

By "alkenyl" is meant an optionally substituted $C_{2-24}$ alkyl group having one or more double bonds. The alkenyl group can be cyclic (e.g., $C_{3-24}$ cycloalkenyl) or acyclic. The alkenyl group can also be substituted or unsubstituted. For example, the alkenyl group can be substituted with one or more substitution groups, as described herein for alkyl. In some embodiments, the unsubstituted alkenyl group is a $C_{2-6}$, $C_{2-12}$, $C_{2-16}$, $C_{2-18}$, $C_{2-20}$, or $C_{2-24}$ alkenyl group.

By "alkynyl" is meant an optionally substituted $C_{2-24}$ alkyl group having one or more triple bonds. The alkynyl group can be cyclic or acyclic and is exemplified by ethynyl, 1-propynyl, and the like. The alkynyl group can also be substituted or unsubstituted. For example, the alkynyl group can be substituted with one or more substitution groups, as described herein for alkyl. In some embodiments, the unsubstituted alkynyl group is a $C_{2-6}$, $C_{2-12}$, $C_{2-16}$, $C_{2-18}$, $C_{2-20}$, or $C_{2-24}$ alkynyl group.

By "alkoxy" is meant —OR, where R is an optionally substituted alkyl group, as described herein. Exemplary alkoxy groups include methoxy, ethoxy, butoxy, trihaloalkoxy, such as trifluoromethoxy, etc. The alkoxy group can be substituted or unsubstituted. For example, the alkoxy group can be substituted with one or more substitution groups, as described herein for alkyl. Exemplary unsubstituted alkoxy groups include $C_{1-3}$, $C_{1-6}$, $C_{1-12}$, $C_{1-16}$, $C_{1-18}$, $C_{1-20}$, or $C_{1-24}$ alkoxy groups.

The term "aryl" as used herein refers to groups that include monocyclic and bicyclic aromatic groups. Examples include phenyl, benzyl, anthracenyl, anthryl, benzocyclobutenyl, benzocyclooctenyl, biphenylyl, chrysenyl, dihydroindenyl, fluoranthenyl, indacenyl, indenyl, naphthyl, phenanthryl, phenoxybenzyl, picenyl, pyrenyl, terphenyl, and the like, including fused benzo-$C_{4-8}$ cycloalkyl radicals (e.g., as defined herein) such as, for instance, indanyl, tetrahydronaphthyl, fluorenyl, and the like. The term aryl also includes heteroaryl, which is defined as a group that contains an aromatic group that has at least one heteroatom incorporated within the ring of the aromatic group. Examples of heteroatoms include, but are not limited to, nitrogen, oxygen, sulfur, and phosphorus. Likewise, the term non-heteroaryl, which is also included in the term aryl, defines a group that contains an aromatic group that does not contain a heteroatom. The aryl group can be substituted or unsubstituted. The aryl group can be substituted with one, two, three, four, or five substituents, such as those described herein for alkyl. In particular embodiments, an unsubstituted aryl group is a $C_{4-18}$, $C_{4-14}$, $C_{4-12}$, $C_{4-10}$, $C_{6-18}$, $C_{6-14}$, $C_{6-12}$, or $C_{6-10}$ aryl group.

By "heterocyclyl" is meant a 3-, 4-, 5-, 6- or 7-membered ring (e.g., a 5-, 6- or 7-membered ring), unless otherwise specified, containing one, two, three, or four non-carbon heteroatoms (e.g., independently selected from the group consisting of nitrogen, oxygen, phosphorous, sulfur, selenium, or halo). The 3-membered ring has zero to one double bonds, the 4- and 5-membered ring has zero to two double bonds, and the 6- and 7-membered rings have zero to three double bonds. The term "heterocyclyl" also includes bicyclic, tricyclic and tetracyclic groups in which any of the above heterocyclic rings is fused to one, two, or three rings independently selected from the group consisting of an aryl ring, a cyclohexane ring, a cyclohexene ring, a cyclopentane ring, a cyclopentene ring, and another monocyclic heterocyclic ring, such as indolyl, quinolyl, isoquinolyl, tetrahydroquinolyl, benzofuryl, benzothienyl and the like. Heterocyclics include acridinyl, adenyl, alloxazinyl, azaadamantanyl, azabenzimidazolyl, azabicyclononyl, azacycloheptyl, azacyclooctyl, azacyclononyl, azahypoxanthinyl, azaindazolyl, azaindolyl, azecinyl, azepanyl, azepinyl, azetidinyl, azetyl, aziridinyl, azirinyl, azocanyl, azocinyl, azonanyl, benzimidazolyl, benzisothiazolyl, benzisoxazolyl, benzodiazepinyl, benzodiazocinyl, benzodihydrofuryl, benzodioxepinyl, benzodioxinyl, benzodioxanyl, benzodioxocinyl, benzodioxolyl, benzodithiepinyl, benzodithiinyl, benzodioxocinyl, benzofuranyl, benzophenazinyl, benzopyranonyl, benzopyranyl, benzopyrenyl, benzopyronyl, benzoquinolinyl, benzoquinolizinyl, benzothiadiazepinyl, benzothiadiazolyl, benzothiazepinyl, benzothiazocinyl, benzothiazolyl, benzothienyl, benzothiophenyl, benzothiazinonyl, benzothiazinyl, benzothiopyranyl, benzothiopyronyl, benzotriazepinyl, benzotriazinonyl, benzotriazinyl, benzotriazolyl, benzoxathiinyl, benzotrioxepinyl, benzoxadiazepinyl, benzoxathiazepinyl, benzoxathiepinyl, benzoxathiocinyl, benzoxazepinyl, benzoxazinyl, benzoxazocinyl, benzoxazolinonyl, benzoxazolinyl, benzoxazolyl, benzylsultamyl benzylsultimyl, bipyrazinyl, bipyridinyl, carbazolyl (e.g., 4H-carbazolyl), carbolinyl (e.g., P-carbolinyl), chromanonyl, chromanyl, chromenyl, cinnolinyl, coumarinyl, cytdinyl, cytosinyl, decahydroisoquinolinyl, decahydroquinolinyl, diazabicyclooctyl, diazetyl, diaziridinethionyl, diaziridinonyl, diaziridinyl, diazirinyl, dibenzisoquinolinyl, dibenzoacridinyl, dibenzocarbazolyl, dibenzofuranyl, dibenzophenazinyl, dibenzopyranonyl, dibenzopyronyl (xanthonyl), dibenzoquinoxalinyl, dibenzothiazepinyl, dibenzothiepinyl, dibenzothiophenyl, dibenzoxepinyl, dihydroazepinyl, dihydroazetyl, dihydrofuranyl, dihydrofuryl, dihydroisoquinolinyl, dihydropyranyl, dihydropyridinyl, dihydroypyridyl, dihydroquinolinyl, dihydrothienyl, dihydroindolyl, dioxanyl, dioxazinyl, dioxindolyl, dioxiranyl, dioxenyl, dioxinyl, dioxobenzofuranyl, dioxolyl, dioxotetrahydrofuranyl, dioxothiomorpholinyl, dithianyl, dithiazolyl, dithienyl, dithiinyl, furanyl, furazanyl, furoyl, furyl, guaninyl, homopiperazinyl, homopiperidinyl, hypoxanthinyl, hydantoinyl, imidazolidinyl, imidazolinyl, imidazolyl, indazolyl (e.g., 1H-indazolyl), indolenyl, indolinyl, indolizinyl, indolyl (e.g., 1H-indolyl or 3H-indolyl), isatinyl, isatyl, isobenzofuranyl, isochromanyl, isochromenyl, isoindazoyl, isoindolinyl, isoindolyl, isopyrazolonyl, isopyrazolyl, isoxazolidiniyl, isoxazolyl, isoquinolinyl, isoquinolinyl, isothiazolidinyl, isothiazolyl, morpholinyl, naphthindazolyl, naphthindolyl, naphthiridinyl, naphthopyranyl, naphthothiazolyl, naphthothioxolyl, naphthotriazolyl, naphthoxindolyl, naphthyridinyl, octahydroisoquinolinyl, oxabicycloheptyl, oxauracil, oxadiazolyl, oxazinyl, oxaziridinyl, oxazolidinyl, oxazolidonyl, oxazolinyl, oxazolonyl, oxazolyl, oxepanyl, oxetanonyl, oxetanyl, oxetyl, oxtenayl, oxindolyl, oxiranyl, oxobenzoisothiazolyl, oxochromenyl, oxoisoquinolinyl, oxoquinolinyl, oxothiolanyl, phenanthridinyl, phenanthrolinyl, phenazinyl, phenothiazinyl, phenothienyl (benzothiofuranyl), phenoxathiinyl, phenoxazinyl, phthalazinyl, phthalazonyl, phthalidyl, phthalimidinyl, piperazinyl, piperidinyl, piperidonyl (e.g., 4-piperidonyl), pteridinyl, purinyl, pyranyl, pyrazinyl, pyrazolidinyl, pyrazolinyl, pyrazolopyrimidinyl, pyrazolyl, pyridazinyl, pyridinyl, pyridopyrazinyl, pyridopyrimidinyl, pyridyl, pyrimidinyl, pyrimidyl, pyronyl, pyrrolidinyl, pyrrolidonyl (e.g., 2-pyrrolidonyl), pyrrolinyl, pyrrolizidinyl, pyrrolyl (e.g., 2H-pyrrolyl), pyrylium, quinazolinyl, quinolinyl, quinolizinyl (e.g., 4H-quinolizinyl), quinoxalinyl, quinuclidinyl, selenazinyl, selenazolyl, selenophenyl, succinimidyl, sulfolanyl, tetrahydrofuranyl, tetrahydrofuryl, tetrahydroisoquinolinyl, tetrahydroisoquinolyl, tetrahydropyridinyl, tetrahydropyridyl (piperidyl), tetrahydropyranyl, tetrahydropyronyl, tetrahydroquinolinyl, tetrahydroquinolyl, tetrahydrothienyl, tetrahydrothiophenyl, tetrazinyl, tetrazolyl, thiadiazinyl (e.g., 6H-1,2,5-thiadiazinyl or 2H,6H-1,5,2-dithiazinyl), thiadiazolyl, thianthrenyl, thianyl, thianaphthenyl, thiazepinyl, thiazinyl, thiazolidinedionyl, thiazolidinyl, thiazolyl, thienyl, thiepanyl, thiepinyl, thietanyl, thietyl, thiiranyl, thiocanyl, thiochromanonyl, thiochromanyl, thiochromenyl, thiodiazinyl, thiodiazolyl, thioindoxyl, thiomorpholinyl, thiophenyl, thiopyranyl, thiopyronyl, thiotriazolyl, thiourazolyl, thioxanyl, thioxolyl, thymidinyl, thyminyl, triazinyl, triazolyl, trithianyl, urazinyl, urazolyl, uretidinyl, uretinyl, uricyl, uridinyl, xanthenyl, xanthinyl, xanthionyl, and the like, as well as modified forms thereof (e.g., including one or more oxo and/or amino) and salts thereof. The heterocyclyl group can be substituted or unsubstituted. For example, the heterocyclyl group can be substituted with one or more substitution groups, as described herein for alkyl.

Introduction

Ionically conductive composite electrolytes that have an ionically-conductive inorganic phase and a non-ionically-conductive organic phase address various challenges of fabricating and using solid state electrolytes. Certain embodiments of the composite electrolytes have relative high polymer loadings (e.g., about 50 vol. %). This can permit use in flexible electronics, and provide good mechanical properties.

Most state-of-the-art composite electrolytes with high organic content rely on ionically conductive polymer matrix rather than inorganic conductors. Typical polymer electrolytes are prepared by dissolving inorganic salt in a polymer matrix, which produces non-single-ion conductors with relatively low ionic conductivities and transference numbers, and that require elevated temperatures for proper operation. In addition, they tend to have poor oxidative stability and decompose during cell operation, leading to inefficiencies in cycling performance and lowered cell life-time. However, mechanical properties of polymers enable easy processing, good interfacial contact with electrodes and flexibility for proper handling and operation of solid-state batteries. Polymer electrolytes can be prepared as composites, with either ionically-conductive or non-conductive inorganic fillers, that can improve both their mechanical and electrochemical properties. Nonetheless, even with addition of inorganic particles, polymer electrolytes still suffer from stability issues and non-single-ion transfer properties.

Provided herein are ionically conductive composite electrolytes that have an ionically-conductive inorganic phase and an organic phase. In some embodiments, the composites are single-ion conductors with good electrochemical stability and room temperature conductivities. The organic phase includes a polymeric binder that provides sufficient mechanical properties that enable processing and incorporation in all-solid-state batteries. The composite electrolytes can also provide high elasticity, bendability, and mechanical strength that may be needed for devices such as flexible electronics that are exposed to significant stresses during operation.

Organic Phase

The organic polymer phase may include one or more polymers and is chemically compatible with the inorganic ion conductive particles. In some embodiments, the organic phase has substantially no ionic conductivity, and is referred to as "non-ionically conductive." Non-ionically conductive polymers are described herein have ionic conductivities of less than 0.0001 S/cm.

According to various embodiments, the organic phase may include a polymeric binder that is polar or non-polar. There are different types of physical forces that occur intramolecularly. Such forces vary in strength and are largely based on structures of interacting molecules. The weakest forces are known as dispersion forces (also referred to as London dispersion forces and van der Waals forces), which exist in all atoms and molecules. Such forces are caused by temporary dipoles, which occur due to uneven distribution of electrons in atoms/molecules, which induce opposite dipoles in neighboring molecules/atom. The formation of temporary dipoles induces partial positive and negative charges that are the source of positive attractions. Such attractions increase with the size of the electron cloud, molar mass and surface are of particles. These are the only type of interactions found in nonpolar molecules and noble gasses. Dipole-dipole Forces occur by permanent dipoles in polar molecules, where molecules arrange in such way that partial positive charges of one particle is next to the negative one on the neighboring molecule. The forces are stronger than London dispersion forces and increase with increasing electronegativity difference between atoms forming dipoles. That attraction also increases with decreasing size of attracted molecule as the distance between attracting molecules decreases. Hydrogen bonding is a specific, strong type of dipole-dipole interactions that occurs between molecules that contain hydrogen atoms attached directly to small, highly electronegative atoms such as nitrogen (N), oxygen (O), or fluorine (F). In such cases, permanent partial positive and negative charges are formed on hydrogen and electronegative atoms respectively. Such permanent partial charges lead to even stronger attraction forces than in case of dipole-dipole forces. Ion-dipole Forces are caused by either ion or the charge attracted to the opposite permanent dipoles occurring in polar molecules in a way that ion is surrounded by molecules with the dipole with opposite charge. These forces, for instance, are responsible for dissolution of salts, such as in electrolytes in lithium-ion batteries or in metal ion complexes with organic ligands.

In the description herein, a non-polar binder is one that materials that in their pure form interact intramolecularly through weak dispersion forces. Such materials have little to no contribution from other, stronger interactions, such as dipole-dipole, or hydrogen bonding that can influence composite electrolyte. Examples include styrene-ethylene-butylene-styrene (SEBS), styrene-butadiene-styrene (SBS), polystyrene (PSt), styrene-isoprene-styrene (SIS), and polyethylene. Such materials show poor affinity and weak interactions with inorganic materials, such as solid-state lithium ion conductors or lithium salts. In some instances, the presence of a polar group can be tolerated at low concentrations, as long as the contribution of stronger forces is negligible. For example, a binder that has less than 2 wt % or less than 0.5 wt % polar groups may still be non-polar if the contribution of the stronger forces is negligible. Other polymeric binders are polar. In yet other embodiments, a non-polar binder is or includes a hydrocarbon (e.g., includes only carbon and hydrogen atoms). A polar binder has a noticeable effect of stronger attraction forces on composite electrolyte properties. These properties include, but are not limited to, tensile strength, modulus, elongation at break, ionic conductivity, and particle dispersibility. The level of polarity can be from very low to very high. Examples of lower polarity binders include SEBS modified with grafted maleic anhydride or SBS modified with carboxylic acid. Polarity depends on the nature of polar groups as well as their weight fraction. In some embodiments, this may be as low as 0.1 wt %. In some embodiments, it is more than 0.5 wt %, for example 1-5 wt %. More polar binders can include polymers with greater than 5% of grafted polar groups. Examples of very polar polymers include poly(vinylacetate) and poly(methylmethacrylate) PMMA. In yet other embodiments, a polar binder is or includes a hydrocarbon having one or more non-carbon heteroatoms (e.g., nitrogen, oxygen, sulfur, silicon, etc.). Such heteroatoms can be provided by way of grafted functional groups, as described herein.

In some embodiments, the organic phase includes a polymer binder, a relatively high molecular weight polymer or mixture of different high molecular weight polymers. A polymer binder has a molecular weight of at least 30 kg/mol, and may be at least 50 kg/mol, or 100 kg/mol. The molecular weight distribution can be monomodal, bimodal and multimodal.

In some embodiments, the polymer binder has a non-polar backbone. Examples of non-polar polymer binders include polymers or copolymers including styrene, butadiene, isoprene, ethylene, and butylene. Styrenic block copolymers including polystyrene blocks and rubber blocks may be used, with examples of rubber blocks including polybutadiene (PBD) and polyisoprene (PI). The rubber blocks may or may be hydrogenated. Specific examples of polymer binders are styrene ethylene butylene styrene (SEBS), styrene-butadiene-styrene (SBS), styrene-isoprene-styrene (SIS), styrene-butadiene rubber (SBR), polystyrene (PSt), PBD, polyethylene (PE), and PI. Non-polar polymers do not coat the inorganic particles, which can lead to reduced conductivity.

The main chain or backbone of the polymeric components of the organic phase do not interact strongly with the inorganic phase. Examples of backbones include saturated or unsaturated polyalkyls, polyaromatics, and polysiloxanes. Examples of backbones that may interact too strongly with the inorganic phase include those with strong electron donating groups such as polyalcohols, polyacids, polyesters, polyethers, polyamines, and polyamides. It is understood that molecules that have other moieties that decrease the binding strength of oxygen or other nucleophile groups may be used. For example, the perfluorinated character of a perfluorinated polyether (PFPE) backbone delocalizes the electron density of the ether oxygens and allows them to be used in certain embodiments.

In some embodiments, hydrophobic block copolymers having both plastic and elastic copolymer segments are used. Examples include styrenic block copolymers such as SEBS, SBS, SIS, styrene-isoprene/butadiene-styrene (SIBS), styrene-ethylene/propylene (SEP), styrene-ethylene/propylene-styrene (SEPS), and isoprene rubber (IR).

In embodiments in which the binder is a copolymer, the constituent polymers may be distributed in any appropriate manner such that the binder can be a block copolymer, a random copolymer, a statistical copolymer, a graft copolymer, etc. The polymer backbone may be linear or non-linear with examples including branched, star, comb, and bottlebrush polymers. Further, transitions between constituent polymers of a copolymer can be sharp, tapered, or random.

In some embodiments, the organic phase is substantially non-ionically conductive, with examples of non-ionically conductive polymers including PDMS, PBD, and the other polymers described above. Unlike ionically conductive polymers such as polyethylene oxide (PEO), polypropylene oxide (PPO), polyacrylonitrile (PAN), poly(methyl methacrylate) (PMMA), which are ionically conductive because they dissolve or dissociate salts such as LiI, non-ionically conductive polymers are not ionically conductive even in the presence of a salt. This is because without dissolving a salt, there are no mobile ions to conduct. In some embodiments, one of these or another ionically conductive polymer may be used. PFPE's, referred to above, and described in Compliant glass-polymer hybrid single ion-conducting electrolytes for lithium ion batteries, PNAS, 52-57, vol. 113, no. 1 (2016), incorporated by reference herein, are ionically conductive, being single ion-conductors for lithium and may be used in some embodiments.

In some embodiments, the organic phase may included cross-linking. In some embodiments, the organic phase is a cross-linked polymer network. Cross-linked polymer networks can be cross-linked in-situ, i.e., after the inorganic particles are mixed with polymer or polymer precursors to form a composite. In-situ polymerization, including in-situ cross-linking, of polymers is described in U.S. Pat. No. 10,079,404, incorporated by reference herein.

Polar Polymeric Binders

Polar polymeric binders that are used in other battery applications, such as carboxymethyl cellulose (CMC), polyethylene oxide (PEO), and polyvinylidene fluoride (PVDF), lead to composites having poor ionic conductivity if mixed with inorganic conductors. This is because the polymers can bind strongly to surface of inorganic particles, forming a dense, insulating coating that prevents direct contact with neighboring particles. Even as low as 1-5 wt. % of such polymers can insulate particles and block lithium-ion pathways across the composite, leading to very resistive materials.

In some embodiments, the polymer binder is a thermoplastic elastomer such as SEBS, SBS, or SIS. The non-polarity and hydrophobic character of such binders allow for high retention of initial conductivity of pure inorganic conductors. In composite materials, including electrolyte separators and electrodes, a solvent and/or and polymer can induce either chemical or morphological changes, and/or loss of conductivity in inorganic conductors. For example, sulfidic inorganic conductors including argyrodite-like inorganics can be degraded by polar polymers and/or polar solvents.

Another challenge addressed by the disclosure herein is the instability of sulfidic materials in composite electrolytes in moderately polar and very polar solvents. Table 1, below, shows the effect of solvent polarity on the stability of sulfidic materials.

TABLE 1

Effect of solvent polarity on the stability of sulfidic materials

| Stability of Sulfidic Materials | Polarity Index of Solvent (P) | Example of Solvent (P) |
|---|---|---|
| Very Unstable | >4.5 | NMP (6.7) |
| | | Acetonitrile (5.8) |
| | | Acetone (5.1) |
| | | Methyl Ethyl Ketone (4.7) |
| Unstable* | >3.5-4.5 | Ethyl Acetate (4.4) |
| | | THF (4.0) |
| | | Chloroform (4.1) |
| | | n-Butyl Alcohol (3.9) |
| Stable | 0-3.5 | Dichloromethane (3.1) |
| | | Chlorobenzene (2.7) |
| | | Xylene (2.5) |
| | | Cyclohexane (0.2) |
| | | Pentane (0.0) |

*Sulfidic materials are stable in halogenated solvents in this range including chloroform While glass materials (such as LPS glasses) are susceptible to polar solvents or polymers induced crystallization, which can cause severe losses in conductivities, crystalline argyrodites have better retention of conductivities. Thus, in some embodiments, argyrodite-containing composites can be prepared with various polymeric binders, including very polar ones, as long as the process is be done without the use of polar solvents that degrade the inorganic. Examples of such binders include poly(vinylacetate), nitrile butadiene rubber having up to 30% nitrile groups, poly(acrylonitrile-co-styrene-co-butadiene) (ABS), poly(ethylene-co-vinylacetate), poly(styrene-co-acrylonitrile) (SAN), poly(styrene-co-maleic anhydride), poly(meth)acrylates, poly(alkyene glycols), poly(butadiene-co-acrylate), poly(butadiene-co-acrylic acid-co-acrylonitrile), poly(ethylene-co-acrylates), polyethers, polyesters of dialkyl phthalates, or poly(vinyl chloride) (PVC).

Embodiments described herein include polymeric binders that include one or more types of functional groups. The functional groups can improve one or more of the following: solubility in organic solvents, adhesion to inorganic particles, adhesion to current collectors, dispersibility of inorganic particles, mechanical performance, ionic conductivity, and electronic conductivity.

In particular embodiments, a non-polar binder such as SEBS is modified with a small amount of a polar functional group. The resulting binder has mechanical properties tailored for use in a composite. In particular embodiments, a polar binder such as PVDF is modified with a functional group. The resulting binder is soluble in less polar solvents.

Functionalized Polymeric Binder

A polymer of polymer binder has a backbone that may be functionalized. As described above, In some embodiments, the polymer backbone is non-polar. Examples include copolymers (block, gradient, random, etc.) such as styrene-butadiene-styrene (SBS), styrene-isoprene-styrene (SIS), styrene-ethylene/propylene-styrene (SEPS), styrene-ethylene-butylene-styrene (SEBS), styrene butadiene rubber (SBR), ethylene propylene diene monomer (EPDM) rubber, and homopolymers such as polybutadiene (PBD), polyethylene (PE), polypropylene (PP), and polystyrene (PS). In some embodiments, the polymer is polar with examples including acrylonitrile-butadiene-styrene (ABS), nitrile rubber (NBR), ethylene vinyl acetate (EVA) copolymers, oxidized polyethylene. Additional examples include fluorinated polymers such as PVDF, polytetrafluoroethylene, and perfluoropolyether (PFPE) and silicones such polydimethylsiloxane (PDMS).

Functional Groups

Functional groups include, but are not limited to aromatic, alkyl (saturated and unsaturated, such as in alkenyl or alkynyl), alcohols (—OH), amines (—N—$R_1R_2$, in which $R_1$ and $R_2$ is, independently, H, optionally substituted alkyl, or optionally substituted aryl, or $R_1$ and $R_2$, taken together with the nitrogen atom to which each are attached, form a heterocyclyl group), heterocyclyl (e.g., substituted furanyl, thiophenyl, or pyrrolyl), carboxylic acid (—C(=O)OH), carboxylate salts (—C(=O)O$^-$M$^+$), carboxylic acid esters (C(=O)O—R), amides (—C(=O)NR$_1$R$_2$), ethers (—OR), thiols (—SH), thioethers (—S—R), disulfides (—SS—R), nitro (—NO$_2$), sulfonic acid (—S(=O)$_2$OH), sulfonates (—S(=O)$_2$O$^-$M$^+$), sulfonic acid esters (—S(=O)$_2$OR), sulfoxides (—S(=O)$_2$R), sulfinic acid (—S(=O)OH), sulfinates (—S(=O)O$^-$M$^+$), sulfinic acid esters (—S(=O)OR), sulfinamide (—S(=O)NR$_1$R$_2$), sulfonamides (—S(=O)$_2$NR$_1$R$_2$), nitrile (—CN), azide (—N$_3$), anhydrides (—C(=O)OC(=O)R), ketones (—C(=O)R), aldehydes (—C(O)H), phosphate acids, salts and esters (—OP(=O)(OR)$_2$), phosphonate acids, salts and esters (—P(=O)(OR)$_2$), phosphinate acids, salts and esters (—P(—R)(=O)OR), phosphines (—P(=O)(—R)$_3$), amides and amido-esters of phosphates, phosphonates, phosphinates and phosphines, carbonates, cyclic esters, cyclic anhydrides, p-keto acids, esters and salts, maleic acid, esters, salts anhydrides, maleimides, malamides, and succinic acid derivatives. Examples are below.

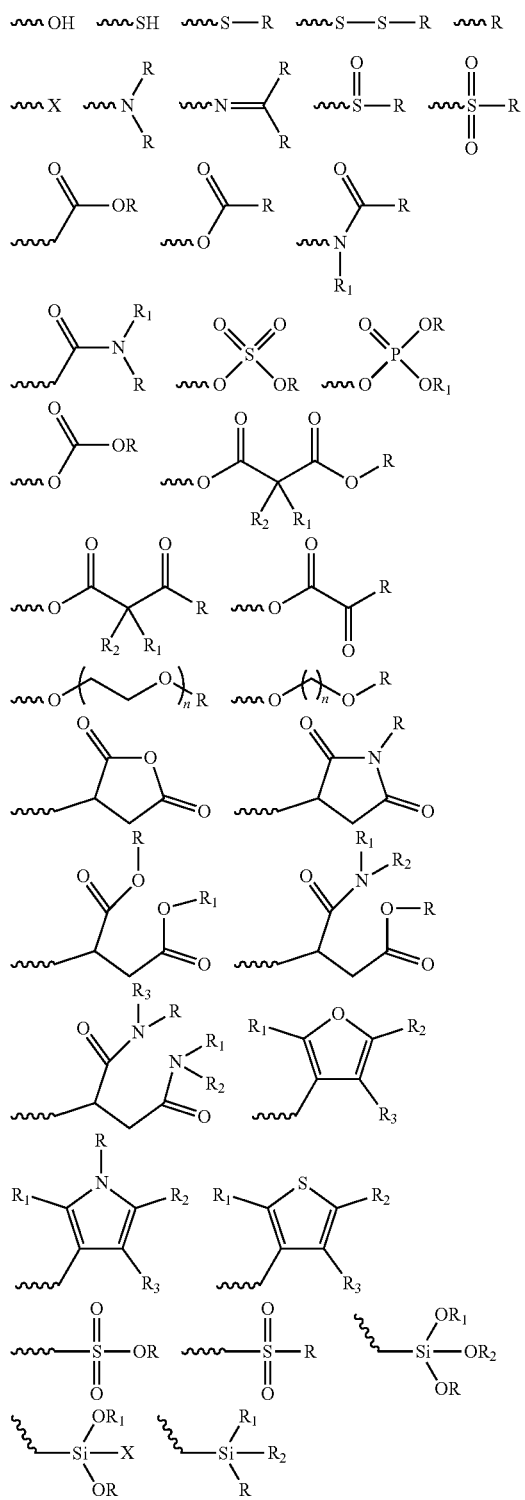

where R, $R_1$, $R_2$, $R_3$ are independently for each occurrence selected from —CN, —H, —OH, a metal cation $Me^+$, —$OMe^+$, optionally substituted aryl, optionally substituted alkoxy, optionally substituted alkyl, optionally substituted alkenyl, and optionally substituted alkynyl; and X is independently for each occurrence selected from —F, —Cl, —Br, and —I; and n is an integer from 1 to 10. Examples of metal cations $Me^+$ include $Li^+$, $Na^+$, and KV. In some instances, the metal cation $Me^+$ interacts with a non-carbon heteroatom (e.g., O, N, S, etc.).

The functional groups can be incorporated during polymerization step and/or in a post-polymerization functionalization step. Polymers can be prepared with one or multiple types of functional groups, depending on targeted features of the binder. The properties include but are not limited to: solubility in organic solvents, adhesion to inorganic particles, adhesion to current collectors, dispersibility of inorganics, mechanical performance, ionic conductivity, electrochemical and chemical stabilities, and electronic conductivity.

In particular examples, non-polar backbones may be functionalized with polar groups to improve mechanical performance. Functionalization of non-polar backbones such as SEBS with groups such as maleic anhydride and furfurylamine described further below.

In some embodiments, the polymer binder has a polar backbone. Polar backbones such as PVDF and NBR may be functionalized with functional groups to improve solubility in solvents having a lower P index. Functional groups include, but are not limited, to fully and partially saturated and unsaturated linear, branched or cyclic hydrocarbons, i.e.: n-butyl, n-hexyl, n-dodecyl, 2-ethylhexyl, cyclohexyl, palmitoyl, linoleoyl, or butenyl groups. Other, non-polar groups include aromatics, such as phenyl, benzyl, naphthalene functionalities. In addition, functional groups with higher polarity can be used as well, as long as they are soluble in solvents with specific P index (Table 1). Examples include, but are not limited to, various mono-, di-, oligo- and polyesters, such as esters of fatty acids or higher C alcohols, i.e.: palmitates, myristates or dodecanol esters, polyesters, i.e: poly(lauryllactone)-block-polytetrahydrofuran, or other polymers, like poly(methyl methacrylate), poly(2-ethylhexyl acrylate). Functionalization of PVDF with non-polar groups such as styrene is described further below.

In some embodiments, binders are functionalized to improve adhesion to current collectors. In some embodiments, a binder may be functionalized with silanes to improve adhesion to metal current collectors, particularly to aluminum and copper. In some embodiments, a binder may be functionalized with acidic functionalities such as phosphates or carboxylates that bond to the surface of metals via chemical reaction. In addition, adhesion can be enhanced via physical interactions, such as hydrogen bonding or ion coordination, that can occur between species present on the surface of current collectors and binder functionalities such as alcohols, amides, and esters.

In some embodiments, binders are functionalized to improve the mechanical properties of composites and their processability. The presence of polar groups might induce ionic conductivity in polymer phase, particularly if mixed with lithium salts, i.e. $LiPF_6$, LiTFSI, $LiClO_4$, etc. However, in many embodiments, the ionic conduction through the polymer phase is expected to be orders of magnitude lower than that of inorganic conductor and hence have negligible contribution to total ionic conductivity. This may generally the case unless polymer is specifically engineered to be ionically conductive.

Hydrophobic Binders Modified with Polar Groups

In some embodiments, the polymer binder is a thermoplastic elastomer such as SEBS, SBS, or SIS. The low polarity and hydrophobic character of such binders allow for high retention of initial conductivity of pure inorganic conductors, such as LPS glasses or argyrodites.

In some embodiments, the polymer binder backbone is SEBS. SEBS is a saturated version of SBS. Saturation reduces unwanted chemical reactions with inorganics or, on electrodes, gelation and improves thermal stability. This is especially true for SBS with high 1,2-vinyl content. Pure PBD (0% styrene) is a rubbery material, where pure PS is a brittle resin. A copolymer of these such as SBS or SEBS shows mixed properties with the plastic and elastic behavior controlled by the volume ratio of the components. According to various embodiments, SBS or SEBS having a styrene volume fraction of 10%-90%, or more particularly 15%-65%, can be used. The triblock polymeric backbone provides high elasticity and mechanical strength, despite highly hydrophobic composition. Polyolefin and polystyrene blocks rely on London and n-T forces and interact very weakly with inorganic conductor particles. Therefore, relatively low pressures and temperatures (above Tg of polystyrene) are sufficient to break physical bonds between the binder and the surface of the inorganic, enabling interparticle contact and hence high conductivities in composite electrolytes. However, weak particle-polymer interactions significantly affect contact between phases, decreasing mechanical properties of the composite and possibly leading to issues with wetting, adhesion, and delamination.

Provided herein are hydrophobic binders modified with small fractions of polar groups (on the level of few %, for example, 0.5-5%) and successfully used as binders in hybrid electrolytes that show improved mechanical performance while maintaining acceptable room temperature ionic conductivities.

A thermoplastic elastomer such as SEBS, SBS, or SIS may be modified with a polar group such as maleic anhydride or furfurylamine. Examples 1 and 2 below describe the increase in modulus, tensile strength, and elongation at break for modified SEBS binders.

Polar Binders Modified with Non-Polar Groups

In some embodiments, the polymer binder backbone is a polar polymer such as PVDF or NBR. In some embodiments, polar polymers are functionalized to improve solubility in solvents that are compatible with the inorganic conductor. In some embodiments, the polar polymers are functionalized to improve compatibility with the inorganic conductor.

In composite materials, including electrolyte separators and electrodes, a solvent and/or and polymer can induce either chemical or morphological changes, and/or loss of conductivity in inorganic conductors. For example, sulfidic inorganic conductors as $Li_2S$—$P_2S_5$, $Li_2S$—$P_2S_5$—LiX, $Li_2S$—$P_2S_5$—$Li_2O$, LiX—$P_2S_5$—$Li_3PO_4$ glasses, glass-ceramics and ceramics, as well as argyrodite-like inorganics can be degraded by polar solvents and/or polar polymers.

Very and moderately polar solvents such as NMP, DMF, DMSO, ethanol, THF, acetone, ethyl acetate should be avoided to prevent loss of conductivity or other undesirable changes. Lower polarity solvents, including hydrocarbons (pentanes, hexanes, heptanes, cyclohexane), aromatics (toluene, xylene, trimethylbenzenes), chlorinated aromatics and hydrocarbons (chlorobenzene, dichlorobenzenes, dichloromethane, dichloroethanes, chloroform), higher C esters, ethers and ketones (2-ethylhexyl acetate, butyl butyrate, dibutyl ether, cyclohexanone), may be used as they do not affect inorganic conductors. Table 1, above, provides guidelines for polarity index of solvents that may be used in some embodiments.

Moderately polar binders, like NBR, have no or poor solubility in with P<3.5 solvents and typically require solvents with P of about 4, like THF or acetone. In case of very polar binders like PVDF, only solvents like NMP (P=6.7) can dissolve them. In some embodiments, polar binders functionalized functional groups that decrease their polarity and providing improved solubility in sulfide-compatible solvents are provides. That is, binders such as NBR or PVDF, are functionalized with non-polar groups to improve their solubility in solvents with lower P index. In some embodiments, up to 50 wt. % of a binder is the functional group.

In some embodiments, a modified PVDF binder is provided. PVDF modified either directly during synthesis, i.e. direct copolymerization with styrene (Scheme 1A) or with radical-active monomer such as chlorotrifluoroethylene (Scheme 1B). In addition, PVdF can be modified in post-functionalization processes, such as ozone pretreatment to form oxides or base treatment to incorporate double bonds.

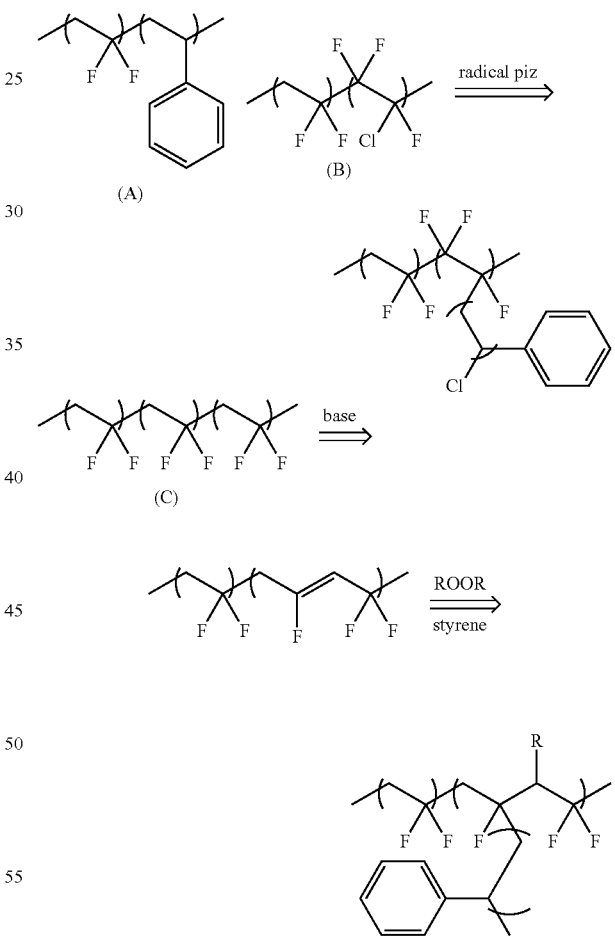

Scheme 1. Incorporation of polystyrene into PVdF via (A) direct copolymerization with styrene, (B) grafting from PVDF copolymerized with chlorotrifluoroethylene, and (C) radical styrene grafting from base-treated PVdF.

Table 2, below, shows examples of polymers that have low solubility in non-polar solvents and may be functionalized to improve solubility for use as polymeric binders in composites.

TABLE 2

Polymers and solubility

| Polymer | Polarity | Solubility |
| --- | --- | --- |
| Polyoxymethylene (POM) | Polar | Low solubility in non-polar solvents |
| Polyamides (PA): aliphatic polyamides such Nylon-6, Nylon-66, etc.; semi-aromatic polyamides such as polyphthalamides, PA-6T, etc.; aromatics polyamides such as aramids, etc. | Polar | Some, e.g. nylon, low solubility in non-polar solvents |
| Polyaryletherketone such as polyetheretherketone (PEEK), etc. | Polar | Low solubility in non-polar solvents |
| Polyimide (PI) | Polar | Low solubility in non-polar solvents |
| Polyamide-imide (PAI) | Polar | Low solubility in non-polar solvents |
| Polyesters such as polyethylene terephthalate (PET), Polybutylene terephthalate (PBT), Polybutylene adipate terephthalate (PBAT), etc. | Polar | Soluble in some polar solvents; low solubility in some non-polar solvents |
| Poly(vinyl chloride) (PVC) | Polar | Soluble in some polar solvents; low solubility in some non-polar solvents |
| Poly(methyl methacrylate) (PMMA) | Polar | Soluble in some polar solvents; low solubility in some non-polar solvents |
| Cellulose acetate (CA) | Polar | Soluble in some polar solvents; low solubility in some non-polar solvents |
| Polyvinylidene fluoride (PVDF) | Polar | Soluble in some polar solvents; low solubility in non-polar solvents |
| Polyethylene oxide (PEO) | Polar | Soluble in some polar solvents; limited solubility in some non-polar solvents |
| Polypropylene oxide (PPO) | Polar | Soluble in some polar solvents; limited solubility in some non-polar solvents |
| Polysulfone (PSU) | Polar | Soluble in some non-polar solvents; low solubility in some non-polar solvents |
| Polyurethane (PU) | Polar | Soluble in some non-polar and polar solvents |
| Polyethersulfone (PES) | Polar | Soluble in some polar solvents; low solubility in some non-polar solvents |
| Polyetherimide (PEI) | Polar | Soluble in some polar solvents; low solubility in some non-polar solvents |
| Acrylonitrile Butadiene Styrene (ABS) | Polar | Soluble in some polar solvents; low solubility in some non-polar solvents |
| Polycarbonate (PC) | Polar | Soluble in some polar solvents; low solubility in some non-polar solvents |
| Poly(vinyl acetate-co-ethylene) (PVAE) | Polar | Soluble in some polar solvents; low solubility in some non-polar solvents |
| Poly(vinyl alcohol) (PVA) | Polar | Soluble in some non-polar solvents; low solubility in some non-polar solvents |
| Nitrile butadiene rubber (NBR) | Polar | Depends on the amount of nitrile groups - soluble in some non-polar solvents; low solubility in some non-polar solvents. |
| Polyacrylonitrile (PAN) | Polar | Soluble in some polar solvents; low solubility in some non-polar solvents |

EXAMPLES

Example 1: Elastic Modulus of SEBS, SEBS-gMA, and SEBS-gFA

SEBS modified with 2% maleic anhydride (SEBS-gMA) and SEBS-gMA functionalized with furfurylamine (SEBS-gFA). SEBS-gFA was synthesized by reacting SEBS-gMA with and excess of furfuryl amine as shown in scheme 1.

Scheme I

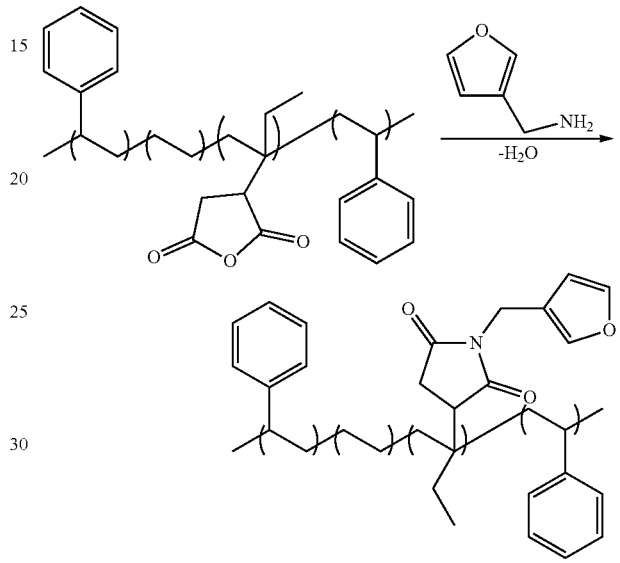

In a glove box operated under nitrogen, 30.0 g (6.1 mmol of maleic anhydride) of polystyrene-b-poly(ethylene-ran-butylene)-b-polystyrene-g-maleic anhydride (SEBS-gMA, Sigma-Aldrich) and 250 g of dry toluene were placed in a 500 ml pressure vessel dried at 145° C. prior to use. The flask was sealed, and the mixture was stirred on a hot-plate at 60° C. until the polymer fully dissolved. Next, the flask was brought back into the box and cooled to room temperature before 2.4 g (24.7 mmol) of furfurylamine was slowly added in to the mixture. The reaction was further stirred at 60° C. for 18 hrs. Afterward the reaction mixture was precipitated into methanol, solids were re-dissolved in dichloromethane and precipitated again into methanol; the process was repeated two more times to obtain the furfuryl-modified SEBS (SEBS-gFA) as white solid. The product was dried under vacuum at 100° C. for 16 hrs. The wt. % of the functional groups in the SEBS-gFA was 3.5%.

Tensile testing of the crosslinked film was performed to determine the elastic modulus, tensile strength and elongation at break. The properties of SEBS-gMA and SEBS-gFA films were measure against SEBS film processed under the same conditions. All films were cut into 8 mm×50 mm strips and at least three measurements per film were performed using a mini tensile tester. Due to the short grip separation of the instrument, the tensile strength and elongation at break could not be measured as the limit of the instrument was reached before the failure of the materials occurred. Each of the polymer films was very elastic, reaching >800% elongation. Table 3 summarizes elastic moduli extracted from stress-strain curves for SEBS, SEBS-gMA, and SEBS-gFA films.

TABLE 3

Elastic moduli of different polymer films.

|  | SEBS | SEBS-gMA | SEBS-gFA |
|---|---|---|---|
| E/MPa | 12.07 ± 0.14 | 20.82 ± 2.96 | 26.82 ± 1.65 |

Elastic moduli measured for SEBS, SEBS-gMA, and SEBS-gFA vary significantly from each other, providing evidence of the importance of the overall composition and type of functional group. Adding 2 wt. % of polar maleic anhydride grafts to SEBS composition drastically increased the modulus of the binder, showing over 70% higher value than unmodified SEBS. Further modification of SEBS-gMA with furfuryl groups resulted in SEBS-gFA binder with even higher modulus of 26.82 MPa.

Example 2: Composite Electrolytes Including SEBS, SEBS-gMA, and SEBS-gFA as Binders After testing mechanical properties of pure SEBS, SEBS-gMA, and SEBS-gFA the polymers were incorporated into composite electrolytes. Each polymer was tested as a binder in hybrids prepared with 80 wt. % of 75:25=$Li_2S:P_2S_5$ sulfide glass. SEBS and SEBS-gMA were also incorporated into composite electrolytes prepared with 80 wt. % $Li_{5.6}PS_{4.6}Cl1.4$ argyrodite. Composites were prepared as thin films via slurry casting, dried and hot-pressed at 160° C. Binder structures are provided below: (A) SEBS; (B) SEBS-gMA, and (C) SEBS-gFA.

(A)

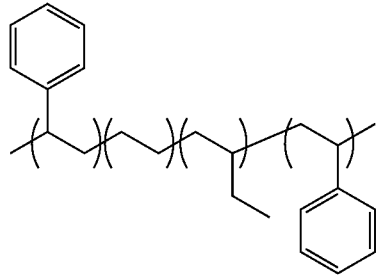

(B)

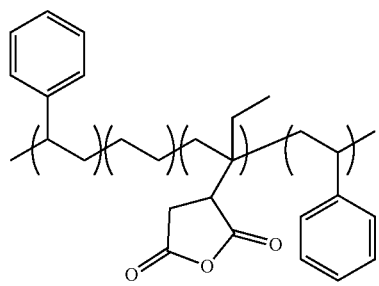

(C)

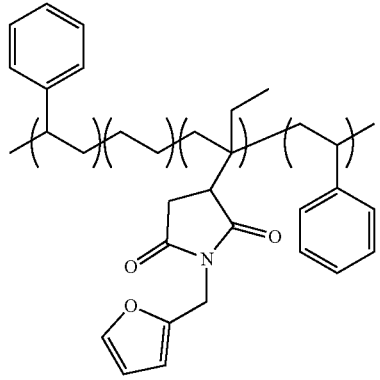

Conductivities of the composites were measured to assess the effect of binder on the conductivity retention of pure 75:25=$Li_2S:P_2S_5$ sulfide glass. The incorporation of polar groups into non-polar binder, such as SEBS, had a drastic effect on conductivity of measured films. When SEBS was used as a binder, the conductivity was about 0.18 mS/cm, showing high (33%) conductivity retention of the original inorganic materials (about 0.55 mS/cm) (Table 3).

SEBS was modified with small amounts of polar functionalities capable of strong binding to the surface of glass particles resulted conductivities dropped by nearly an order of magnitude (Table 5). The composite with SEBS and SEBS-gMA mixed binders (1:4, w/w) showed good conductivity of 0.102 mS/cm (Table 5), providing evidence that the ionic conductivity of composite electrolytes drops exponentially with increasing fraction of SEBS-gMA in 20 wt. % total of polymer phase. The trend shows a linear drop in conductivity on a semi-logarithmic scale. When pure SEBS-gFA was used as the organic matrix, the conductivity was only lower by the factor of 2.3x. In case of argyrodite composites, conductivity for SEBS-gMA was about 30% lower as compared to about 90% observed in glass composites. These results show that glassy materials are susceptible to polar solvents or polymers induced crystallization, which causes severe losses in conductivities. On the other hand, crystalline argyrodites show better retention of conductivities (as compared to composites with non-polar SEBS binder, not the actual inorganic powder) as they do not suffer from conductivity loss during crystallization process.

In some embodiments, argyrodite (or other crystalline sulfidic conductors) composites can be prepared with various polymeric binders, including very polar ones, as long as the process is be done without the use of polar solvents that degrade the inorganic. Table 4 below summarizes composites prepared with 5 wt. % binders (95 wt. % argyrodite) with increasing polarity, SEBS-gMA, $NBR_{20}$ (20% nitrile groups) and poly(vinyl acetate) (PVAc), that show conductivities between about 0.5 mS/cm and 0.7 mS/cm. There is a drop in conductivities of composites with more polar binders, but it is not as drastic as in case of glasses. Produced composites maintain good conductivies, while having better mechanical properties.

TABLE 4

Conductivity of argyrodite-containing composites

| Conductor composition | Polymer binder | Conductivity at 25° C./mS · cm$^{-1}$ |
|---|---|---|
| $Li_{5.6}PS_{1.4}Cl_{1.4}$ | SEBS-gMA | 0.705 |
| | $NBR_{20}$ | 0.606 |
| | PVAc | 0.508 |

Mechanical testing of all composites was done to obtain elastic modulus, tensile strength and elongation at break. Mechanical testing was performed under the same conditions as for the pure polymer films. Modulus, tensile strength and elongation at break values were extracted from stress-strain curves and summarized in Table 5.

TABLE 5

Conductivity and mechanical properties measured for hybrids with 80 wt. % 75:25 = $Li_2S:P_2S_5$ glass or $Li_{5.6}PS_{4.6}Cl_{1.4}$ argyrodites and different polymer binders (20 wt. %)

| Conductor comp. | Polymer binder | Modulus/GPa | Tensile Strength/MPa | Elongation at break/% | Cond. at 25° C./mS · cm$^{-1}$ |
|---|---|---|---|---|---|
| $Li_2S:P_2S_5$ = | SEBS | 0.575 ± 0.116 | 4.24 ± 0.68 | 2.20 ± 0.33 | 0.182 |
| 75:25 | SEBS-gMA | 0.646 ± 0.107 | 5.56 ± 0.08 | 4.47 ± 0.27 | 0.023 |
| (80 wt. %) | SEBS:SEBS-gMA (4:1) | — | — | — | 0.102 |
| | SEBS-gFA | 0.606 ± 0.065 | 8.29 ± 0.27 | 17.00 ± 0.30 | 0.078 |
| $Li_{5.6}PS_{1.4}Cl_{1.4}$ | SEBS | 0.815 ± 0.060 | 5.74 ± 0.13 | 1.98 ± 0.19 | 0.325 |
| (80 wt. %) | SEBS-gMA | 0.758 ± 0.105 | 11.6 ± 0.00 | 20.24 ± 2.24 | 0.213 |

Visual comparison of stress-strain curves obtained for composites with different binders showed a clear difference in mechanical properties. Increasing tensile strength and elongation at break of composites prepared with higher polarity binders. In the case of SEBS only composites, the samples break at only about 2% elongation. When SEBS-gMA, containing as little as 2 wt. % of maleic grafts, is incorporated into a composite the value doubles reaching 4.5% for 75:25=$Li_2S:P_2S_5$ glass composite. The elasticity of the composite increases even more, up to about 10 times, for argyrodite-containing composites, providing 20.24% elongation. Further modification with furfuryl groups (SEBS-gFA) increased the wt. % of polar groups to 3.5 wt. %. That modification drastically increased the elongation at break to 17.0% for 75:25=$Li_2S:P_2S_5$ glass composite, which is respectively 8.5 and 4 times higher than in case of SEBS and SEBS-gMA. The same trend was observed for tensile strength of films, which showed 4.2, 5.6 and 8.3 MPa values for SEBS, SEBS-gMA and SEBS-gFA binder respectively, providing evidence of improved resistance of films to breakage when more polar binder is incorporated into organic matrix.

Similar observations were made for argyrodite films where ultimate strength changed from 5.74 to 11.6 MPa when binder was changed from SEBS to SEBS-gMA. The elastic modulus of was barely dependent on the type of binder, varying between 0.57-0.65 GPa for glasses and 0.76-0.82 GPa for argyrodite composites.

The composites in Table 5 have lower conductivity than those in Table 4 due to the higher polymer loading. However, the conductivity retention of the argyrodite-containing composites is clear. In some embodiments, argyrodites in a polar polymer may have conductivities of at least 0.2 mS·cm$^{-1}$ at 25° C., at least 0.25 mS·cm$^{-1}$ at 25° C., or least 0.35 mS·cm$^{-1}$ at 25° C. with a maximum ionically conductive particle content of 90 wt %, 85 wt %, or 80 wt %. At the same time, mechanical properties may be good due to the presence of polar groups, e.g., elongation at break is at least 5%, 10%, 15%, or 20%.

The data shows that properties of composite electrolytes can be finely tuned by controlling the composition of both organic and inorganic phases. The subtle changes to chemical composition of binder can have tremendous effect on properties of resulting composites. The mechanical strength and elasticity can be increased several times by adding as little as 2% of polar functional groups, while conductivity can remain in acceptable room temperature range.

Inorganic Phase

The inorganic phase of the composite materials described herein conducts alkali ions. In some embodiments, it is responsible for all of the ion conductivity of the composite material, providing ionically conductive pathways through the composite material.

The inorganic phase is a particulate solid-state material that conducts alkali ions. In the examples given below, lithium ion conducting materials are chiefly described, though sodium ion conducting or other alkali ion conducting materials may be employed. According to various embodiments, the materials may be glass particles, ceramic particles, or glass ceramic particles. The methods are particularly useful for composites having glass or glass ceramic particles. In particular, as described above, the methods may be used to provide composites having glass or glass ceramic particles and a polar polymer without inducing crystallization (or further crystallization) of the particles.

The solid-state compositions described herein are not limited to a particular type of compound but may employ any solid-state inorganic ionically conductive particulate material, examples of which are given below.

In some embodiments, the inorganic material is a single ion conductor, which has a transference number close to unity. The transference number of an ion in an electrolyte is the fraction of total current carried in the electrolyte for the ion. Single-ion conductors have a transference number close to unity. According to various embodiments, the transference number of the inorganic phase of the solid electrolyte is at least 0.9 (for example, 0.99).

The inorganic phase may be an oxide-based composition, a sulfide-based composition, or a phosphate-based composition, and may be crystalline, partially crystalline, or amorphous. As described above, the certain embodiments of methods are particularly useful for sulfide-based compositions, which can degrade in the presence of polar polymers.

In certain embodiments, the inorganic phase may be doped to increase conductivity. Examples of solid lithium ion conducting materials include perovskites (e.g., $Li_{3x}La_{(2/3)-x}TiO_3$, $0 \leq x \leq 0.67$), lithium super ionic conductor (LISICON) compounds (e.g., $Li_{2+2x}Zn_{1-x}GeO_4$, $0 \leq x \leq 1$; $Li_{14}ZnGe_4O_{16}$), thio-LISICON compounds (e.g., $Li_{4-x}A_{1-y}B_yS_4$, A is Si, Ge or Sn, B is P, Al, Zn, Ga; $Li_{10}SnP_2S_{12}$), garnets (e.g. $Li_7La_3Zr_2O_{12}$, $Li_5La_3M_2O_{12}$, M is Ta or Nb); NASICON-type Li ion conductors (e.g., $Li_{1.3}Al_{0.3}Ti_{1.7}(PO_4)_3$), oxide glasses or glass ceramics (e.g., $Li_3BO_3$—$Li_2SO_4$, $Li_2O$—$P_2O_5$, $Li_2O$—$SiO_2$), argyrodites (e.g. $Li_6PS_5X$ where X=Cl, Br, I), sulfide glasses or glass ceramics (e.g., $75Li_2S$-$25P_2S_5$, $Li_2S$—$SiS_2$, $LiI$—$Li_2S$—$B_2S_3$) and phosphates (e.g., $Li_{1-x}Al_xGe_{2-x}(PO_4)_3$(LAGP), $Li_{1+x}Ti_{2-x}Al_x(PO_4)$). Further examples include lithium rich anti-perovskite (LiRAP) particles. As described in Zhao and Daement, Jour J. Am. Chem. Soc., 2012, 134 (36), pp 15042-15047, incorporated by reference herein, these LiRAP particles have an ionic conductivity of greater than $10^{-3}$ S/cm at room temperature.

Examples of solid lithium ion conducting materials include sodium super ionic conductor (NASICON) compounds (e.g., $Na_{1+x}Zr_2Si_xP_{3-x}O_{12}$, $0 < x < 3$). Further examples of solid lithium ion conducting materials may be found in Cao et al., Front. Energy Res. (2014) 2:25 and Knauth, Solid State Ionics 180 (2009) 911-916, both of which are incorporated by reference herein.

Further examples of ion conducting glasses are disclosed in Ribes et al., J. Non-Cryst. Solids, Vol. 38-39 (1980) 271-276 and Minami, J. Non-Cryst. Solids, Vol. 95-96 (1987) 107-118, which are incorporated by reference herein.

According to various embodiments, an inorganic phase may include one or more types of inorganic ionically conductive particles. The particle size of the inorganic phase may vary according to the particular application, with an average diameter of the particles of the composition being between 0.1 μm and 500 μm for most applications. In some embodiments, the average diameter is between 0.1 μm and 100 μm. In some embodiments, a multi-modal size distribution may be used to optimize particle packing. For example, a bi-modal distribution may be used. In some embodiments, particles having a size of 1 μm or less are used such that the average nearest particle distance in the composite is no more than 1 μm. This can help prevent dendrite growth. In some embodiments, average particle size is less 10 μm or less than 7 μm. In some embodiments, a multi-modal size distribution having a first size distribution with an average size of less than 7 μm and a second size of greater than 10 μm may be used. Larger particles lead to membranes with more robust mechanical properties and better conductivities, while smaller particles give more compact, uniform films with lower porosity and better density.

The inorganic phase may be manufactured by any appropriate method. For example, crystalline materials may be obtained using different synthetic methods such as solution, sol-gel, and solid state reactions. Glass electrolytes may be obtained by quench-melt, solution synthesis or mechanical milling as described in Tatsumisago, M.; Takano, R.; Tadanaga K.; Hayashi, A. J. Power Sources 2014, 270, 603-607, incorporated by reference herein.

As used herein, the term amorphous glass material refers to materials that are at least half amorphous though they may have small regions of crystallinity. For example, an amorphous glass particle may be fully amorphous (100% amorphous), at least 95% (vol). amorphous, at least 80% (vol.) amorphous, or at least 75% (vol.) amorphous. While these amorphous particles may have one or more small regions of crystallinity, ion conduction through the particles is through conductive paths that are mostly or wholly isotropic.

Ionically conductive glass-ceramic particles have amorphous regions but are at least half crystalline, for example, having at least 75% (vol.) crystallinity. Glass-ceramic particles may be used in the composites described, herein, with glass-ceramic particles having a relatively high amount of amorphous character (e.g., at least 40 (vol) % amorphous) useful in certain embodiments for their isotropic conductive paths. In some embodiments, ionically conductive ceramic particles may be used. Ionically conductive ceramic particles refer to materials that are mostly crystalline though they may have small amorphous regions. For example, a ceramic particle may be fully crystalline (100% vol. crystalline) or at least 95% (vol). crystalline.

In some embodiments, the inorganic phase includes argyrodites. The argyrodites may have the general formula:

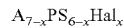

$$A_{7-x}PS_{6-x}Hal_x$$

A is an alkali metal and Hal is selected from chlorine (Cl), bromine (Br), and iodine (I). In some embodiments, the argyrodite may have a general formula as given above, and further be doped. An example is argyrodites doped with thiophilic metals:

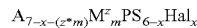

$$A_{7-x-(z*m)}M^z_mPS_{6-x}Hal_x$$

wherein A is an alkali metal; M is a metal selected from manganese (Mn), iron (Fe), cobalt (Co), nickel (Ni), copper (Cu), zinc (Zn), and mercury (Hg); Hal is selected from chlorine (Cl), bromine (Br), and iodine (I); z is the oxidation state of the metal; $0 \leq x \leq 2$; and $0 \leq m < (7-x)/z$. In some embodiments, A is lithium (Li), sodium (Na) or potassium (K). In some embodiments, A is Li. Metal-doped argyrodites are described further in U.S. patent application Ser. No. 16/829,962, incorporated by reference herein. In some embodiments, the composite may include oxide argyrodites, for example, as described in U.S. patent application Ser. No. 16/576,570, incorporated by reference herein. Alkali metal argyrodites include argyrodites of the formulae given above as well as argyrodites described in US Patent Publication No. 20170352916 which include $Li_{7-x+y}PS_{6-x}Cl_{x+y}$ where x and y satisfy the formula $0.05 \leq y \leq 0.9$ and $-3.0x + 1.8 \leq y \leq -3.0x + 5$, or other argyrodites with $A_{7-x+y}PS_{6-x}Hal_{x+y}$ formula. Such argyrodites may also be doped with metal as described above, which include $A_{7-x+y-(z*m)}M^z_mPS_{6-x}Hal_{x+y}$.

The mineral Argyrodite, $Ag_8GeS_6$, can be thought of as a co-crystal of $Ag_4GeS_4$ and two equivalents of $Ag_2S$. Substitutions in both cations and anions can be made in this crystal while still retaining the same overall spatial arrangement of the various ions. In $Li_7PS_6$, $PS_4 3-$ ions reside on the crystallographic location occupied by $GeS_4^{4-}$ in the original mineral, while $S^{2-}$ ions retain their original positions and $Li^+$ ions take the positions of the original $Ag^+$ ions. As there are fewer cations in $Li_7PS_6$ compared to the original $Ag_8GeS_6$, some cation sites are vacant. These structural analogs of the original Argyrodite mineral are referred to as argyrodites as well.

Both $Ag_8GeS_6$ and $Li_7PS_6$ are orthorhombic crystals at room temperature, while at elevated temperatures phase transitions to cubic space groups occur. Making the further substitution of one equivalent of LiCl for one $Li_2S$ yields the material $Li_6PS_5Cl$, which still retains the argyrodite structure but undergoes the orthorhombic to cubic phase transition below room temperature and has a significantly higher lithium-ion conductivity. Because the overall arrangement of cations and anions remains the same in this material as well, it is also commonly referred to as an argyrodite. Further substitutions which also retain this overall structure may therefore also be referred to as argyrodites. Alkali metal argyrodites more generally are any of the class of conductive crystals with alkali metals occupying $Ag^+$ sites in the original Argyrodite structure, and which retain the spatial arrangement of the anions found in the original mineral.

Figure 2:
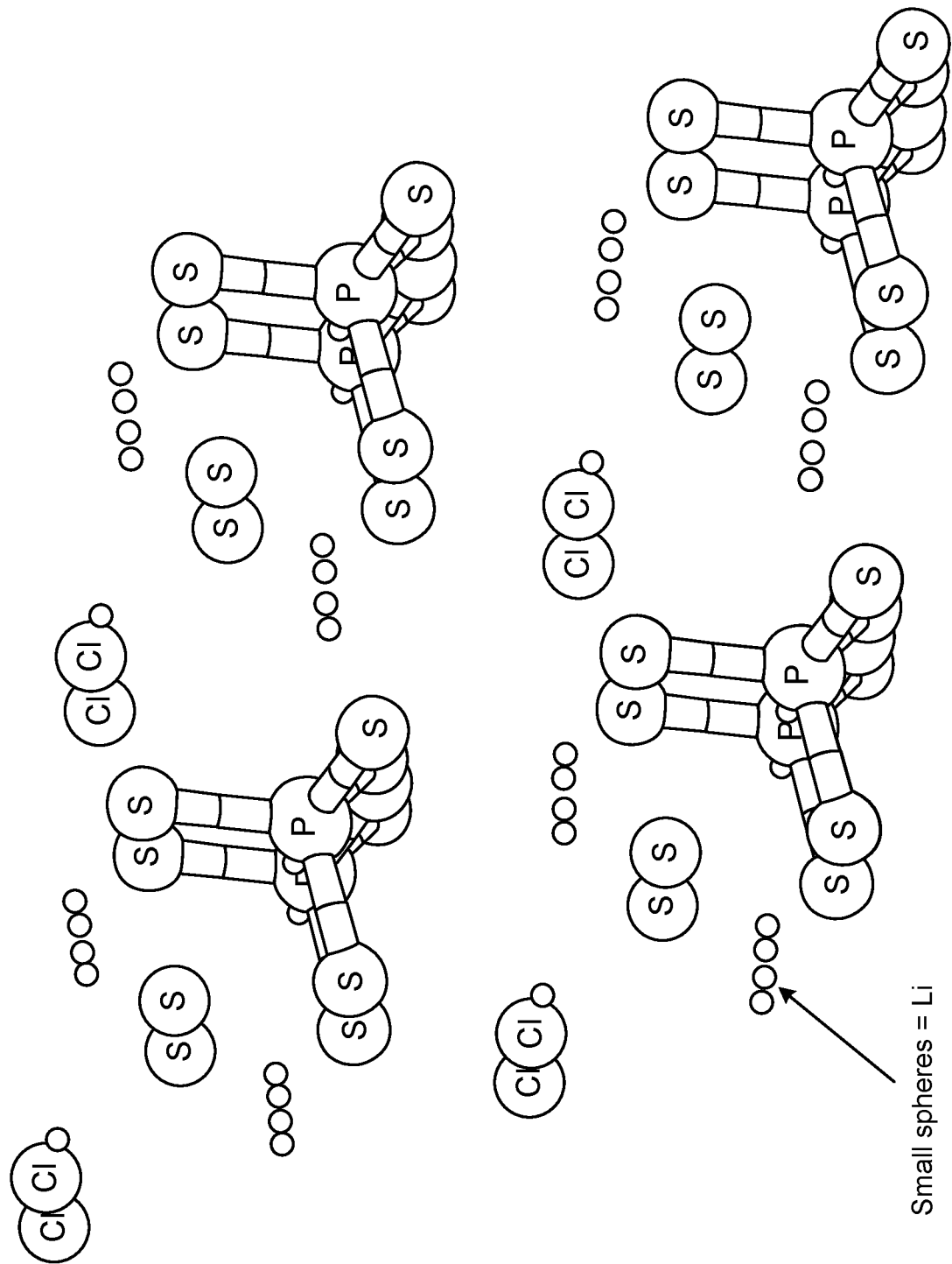
FIG. 2 shows the crystal structure of cubic argyrodite $Li_6PS_5Cl$.

In one example, a lithium-containing example of this mineral type, $Li_7PS_6$, $PS_4^{3-}$ ions reside on the crystallographic location occupied by $GeS_4^{4-}$ in the original mineral, while $S^{2-}$ ions retain their original positions and $Li^+$ ions take the positions of the original $Ag^+$ ions. As there are fewer cations in $Li_7PS_6$ compared to the original $Ag_8GeS_6$, some cation sites are vacant. As indicated above, making the further substitution of one equivalent of LiCl for one $Li_2S$ yields the material $Li_6PS_5Cl$, which still retains the argyrodite structure. FIG. 2 shows a cubic argyrodite $Li_6PS_5Cl$. In the example of FIG. 2, $Li^+$ occupies the $Ag^+$ sites in the Argyrodite mineral, $PS_4^{3-}$ occupies the $GeS_4^{4-}$ sites in the original, and a one to one ratio of $S_2$ and $Cl^-$ occupy the two original $S^{2-}$ sites.

There are various manners in which substitutions may be made that retain the overall argyrodite structure. For example, the original mineral has two equivalents of $S^{2-}$, which can be substituted with chalcogen ions such as $O^{2-}$, $Se^{2-}$, and $Te^{2-}$. A significant fraction of the of $S^{2-}$ can be substituted with halogens. For example, up to about 1.6 of the two equivalents of $S^{2-}$ can be substituted with $Cl^-$, Br, and $I^{-1}$, with the exact amount depending on other ions in the system. While $Cl^-$ is similar in size to $S^{2-}$, it has one charge instead of two and has substantially different bonding and reactivity properties. Other substitutions may be made, for example, in some cases, some of the $S^{2-}$ can be substituted with a halogen (e.g., $Cl^-$) and the rest replaced with $Se^{2-}$. Similarly, various substitutions may be made for the $GeS_4^{3-}$ sites. $PS_4^{3-}$ may replace $GeS_4^{3-}$; also $PO_4^{3-}$, $PSe_4^{3-}$, $SiS_4^{3-}$, etc. These are all tetrahedral ions with four chalcogen atoms, overall larger than $S^{2-}$, and triply or quadruply charged.

In other examples, which will be compared to the $Li_6PS_5Cl$ argyrodite structure described above, $Li_6PS_5Br$ and $Li_6PS_5I$ substitute larger halides in place of the chloride, e.g., $Li_6PO_5Cl$ and $Li_6PO_5Br$. Z. anorg. Allg. Chem., 2010, no. 636, 1920-1924, incorporated by reference herein for the purpose of describing certain argyrodites, contain the halide substitutions described as well as exchanging every sulfur atom in the structure, in both the $S^{2-}$ and $PS_4^{3-}$ ions, for oxygen. The phosphorus atoms in the $PS_4^{3-}$ ions found in most examples of lithium-containing argyrodites can also be partially or wholly substituted, for instance the series $Li_{7+x}M_xP_{1-x}S_6$ (M=Si, Ge) forms argyrodite structures over a wide range of x. See J. Mater. Chem. A, 2019, no. 7, 2717-2722, incorporated by reference herein for the purpose of describing certain argyrodites. Substitution for P can also be made while incorporating halogens. For example, $Li_{6+x}Si_xP_{1-x}S_5Br$ is stable from x=0 to about 0.5. See J. Mater. Chem. A, 2017, no. 6, 645-651, incorporated by reference herein for the purpose of describing certain argyrodites. Compounds in the series $Li_{7+x}M_xSb_{1-x}S_6$(M=Si, Ge, Sn), where a mixture of $SbS_4^{3-}$ and $MS_4^{4-}$ are substituted in place of $PS_4^{3-}$ and $I^-$ is used in place of $Cl^-$, have been prepared and found to form the argyrodite structure. See J. Am. Chem. Soc., 2019, no. 141, 19002-19013, incorporated by reference herein for the purpose of describing certain argyrodites. Other cations besides lithium (or silver) can also be substituted into the cation sites. $Cu_6PS_5Cl$, $Cu_6PS_5Br$, $Cu_6PS_5I$, $Cu_6AsS_5Br$, $Cu_6AsS_5I$, $Cu_{7.82}SiS_{5.82}Br_{0.18}$, $Cu_7SiS_5I$, $Cu_{7.49}SiS_{5.49}I_{0.51}$, $Cu_{7.44}SiSe_{5.44}I_{0.56}$, $Cu_{7.75}GeS_{5.75}Br_{0.25}$, $Cu_7GeS_5I$ and $Cu_{7.52}GeSe_{5.52}I_{0.48}$ have all been synthesized and have argyrodite crystal structures. See Z. Kristallogr, 2005, no. 220, 281-294, incorporated by reference herein for the purpose of describing certain argyrodites. From the list of examples, it can be seen that not only can single elements be substituted in any of the various parts of the argyrodite structure, but combinations of substitutions also often yield argyrodite structures. These include argyrodites described in US Patent Publication No. 20170352916 which include $Li_{7-x+y}PS_{6-x}Cl_{x+y}$ where x and y satisfy the formula $0.05 \le y \le 0.9$ and $-3.0x+1.8 \le y \le -3.0x+5.7$.

The argyrodites used in the compositions herein described include sulfide-based ion conductors with a substantial (at least 20%, and often at least 50%) of the anions being sulfur-containing (e.g., $S^{2-}$ and $PS_4^{3-}$). Sulfide-based lithium argyrodite materials exhibit high $Li^+$ mobility and are of interest in lithium batteries. As indicated above, an example material in this family is $Li_6PS_5Cl$, which is a ternary co-crystal of $Li_3PS_4$, $Li_2S$, and LiCl. Various embodiments of argyrodites described herein have thiophilic metals that may occupy lithium cation sites in the argyrodite crystal structure. In an argyrodite as shown in FIG. 2, each cation is coordinated to two sulfurs which are members of $PS_4^{3-}$ anions, one $S^{2-}$ sulfur anion, and two chloride anions. In some embodiments, a thiophilic metal occupies some fraction of these lithium cation sites to suppress hydrogen sulfide generation. Thiophilic metals may be used to similarly dope other alkali metal argyrodites.

Composites

Provided herein are composites including organic phase and non-ionically conductive particles. In some embodiments, the organic phase has substantially no ionic conductivity, and is referred to as "non-ionically conductive." Non-ionically conductive polymers described herein have ionic conductivities of less than 0.0001 S/cm. In some embodiments, the organic phase may include a polymer that is ionically conductive in the present of a salt such as LiI. Ionically conductive polymers such as polyethylene oxide (PEO), polypropylene oxide (PPO), polyacrylonitrile (PAN), poly(methyl methacrylate) (PMMA), which are ionically conductive in presence of a salt dissolve or dissociate salts such as LiI. Non-ionically conductive polymers do not dissolve or dissociate salts and are not ionically conductive even in the presence of a salt. This is because without dissolving a salt, there are no mobile ions to conduct.

The polymer loading in the solid phase composites may be relatively high in some embodiments, e.g., being at least 2.5%-30% by weight. According to various embodiments, it may between 0.5 wt %-60 wt % polymer, 1 wt %-40 wt % polymer, or 5 wt %-30 wt %. The solid phase composites form a continuous film.

In some embodiments, the inorganic conductor is at least 75 wt %, at least 80 wt %, at least 85 wt %, at least 90 wt %, or at least 95 wt % of the composite. Conductivity increases with increasing content, but mechanical strength can decrease. In some embodiments, the inorganic conductor is between 75 wt % and 98 wt %, e.g., between 80 wt % and 95 wt %. The balance of the composite may be polymer.

As indicated above, the composite contains a functionalized polymer backbone binder. The binder may be a mixture of functionalized and non-functionalized polymer binders. For example, in some embodiments, a binder may be a mixture of a non-polar polymer (e.g., SEBS) and a functionalized version of the polymer (e.g., SEBS-gFA). A mixture may be 1:9-9:1 wt. % polymer:functionalized polymer according to various embodiments, e.g., 1:5-5:1, or between 1:4-4:1. An unmodified version of the polymer (SEBS) includes unfunctionalized polymers and polymers that include insignificant group of functional groups that do not change the properties of the polymer. Similarly, in some embodiments, the binder may be a mixture of two or more polymers having different degrees of functionalization (e.g., 1 wt % and 4 wt %).

According to various embodiments, the polymer binder may be essentially all of the organic phase of the composite, or at least 95 wt. %, 90 wt. %, at least 80 wt. %, at least 70 wt. %, at least 60 wt. %, or at least 50 wt. %, of the composite.

In some embodiments, the composites consist essentially of ion-conductive inorganic particles and the organic phase. However, in alternative embodiments, one or more additional components may be added to the solid composites.

According to various embodiments, the solid compositions may or may not include an added salt. Lithium salts (e.g., LiPF6, LiTFSI), potassium salts, sodium salts, etc. can be added to improve ionic conductivity in embodiments that include an ionically conductive polymer such as PEO. In some embodiments, the solid-state compositions include substantially no added salts. "Substantially no added salts" means no more than a trace amount of a salt. In some embodiments, the ionic conductivity of the composite is substantially provided by the inorganic particles. Even if an ionically conductive polymer is used, it may not contribute more than 0.01 mS/cm, 0.05 mS/cm. or 0.1 mS/cm to the ionic conductivity of the composite. In other embodiments, it may contribute more.

In some embodiments, the solid-state composition may include one or more conductivity enhancers. In some embodiments, the electrolyte may include one or more filler materials, including ceramic fillers such as $Al_2O_3$. If used, a filler may or may not be an ion conductor depending on the particular embodiment. In some embodiments, the composite may include one or more dispersants. Further, in some embodiments, an organic phase of a solid-state composition may include one or more additional organic components to facilitate manufacture of an electrolyte having mechanical properties desired for a particular application.

In some embodiments, discussed further below, the composites are incorporated into, or are ready to be incorporated into, an electrode and include electrochemically active material, and optionally, an electronically conductive additive. Examples of constituents and compositions of electrodes are provided below.

In some embodiments, the electrolyte may include an electrode stabilizing agent that can be used to form a passivation layer on the surface of an electrode. Examples of electrode stabilizing agents are described in U.S. Pat. No. 9,093,722. In some embodiments, the electrolyte may include conductivity enhancers, fillers, or organic components as described above.

The composite may be provided as a free-standing film, a free-standing film that is provided on a release film, a film that has been laminated on component of a battery or other device such as an electrode or a separator, or a film that has been cast onto an electrode, separator, or other component.

A composite film may be of any suitable thickness depending upon the particular battery or other device design. For many applications, the thickness may be between 1 micron and 250 microns, for example 15 microns. In some embodiments, the electrolyte may be significantly thicker, e.g., on the order of millimeters.

In some embodiments, the composites are provided as a slurry or paste. In such cases, the composition includes a solvent to be later evaporated. In addition, the composition may include one or more components for storage stability. Such compounds can include an acrylic resin. Once ready for processing the slurry or paste may be cast or spread on a substrate as appropriate and dried. According to various embodiments, the slurries may have about 40 wt %-50 wt % solids content, e.g., 42 wt %-45 wt %. The solids content is inorganic particles (e.g., between 80 wt % and 95 wt % inorganic conductor and 5 wt % and 20 wt % polymer.)

In some embodiments, the composites are provided as solid mixtures that can be extruded.

Devices

The composites described herein may be incorporated into any device that uses an ionic conductor, including but not limited to batteries and fuel cells. In a battery, for example, the composite may be used as an electrolyte separator.

The electrode compositions further include an electrode active material, and optionally, a conductive additive. Example cathode and anode compositions are given below.

For cathode compositions, the table below gives examples of compositions.

| Constituent | Active material | Inorganic conductor | Electronic conductivity additive | Organic phase |
|---|---|---|---|---|
| Examples | NMC<br>NCA<br>LiFePO4<br>LiCoO2 | Argyrodites (e.g., $Li_6PS_5Cl$, $Li_{5.6}PS_{4.6}Cl_{1.4}$, $Li_{5.4}M_{0.1}PS_{4.6}Cl_{1.4}$, $Li_{5.8}M_{0.1}PS_5Cl$, $Na_{5.8}M_{0.1}PS_5Cl$<br><br>Sulfide glasses or glass ceramics (e.g., $75Li_2S \cdot 25P_2S_5$) | Carbon-based<br>Activated carbons<br>CNTs<br>Graphene<br>Graphite<br>Carbon fibers<br>Carbon black (e.g., Super C) | PVDF-PS copolymer<br>PVDF:PVDF-PS copolymer<br>SEBS:PVDF-PS copolymer<br>SEBS<br>SBR<br>SIS<br>NBR |
| Wt % range | 65%-88% | 10%-33% | 1%-5% | 1%-5% |

According to various embodiments, the cathode active material is a transition metal oxide, with lithium nickel cobalt manganese oxide ($LiMnCoMnO_2$, or NMC) an example. Various forms of NMC may be used, including $LiNi_{0.6}Mn_{0.2}Co_{0.2}O_2$ (NMC-622), $LiNi_{0.4}Mn_{0.3}Co_{0.3}O_2$ (NMC-4330), etc. The lower end of the wt % range is set by energy density; compositions having less than 65 wt % active material have low energy density and may not be useful.

Any appropriate inorganic conductor may be used as described above in the description of inorganic conductors. $Li_{5.6}PS_{4.6}Cl_{1.4}$ is an example of an argyrodite with high conductivity. $Li_{5.4}Cu_{0.1}PS_{4.6}Co_{1.4}$ is an example of an argyrodite that retains high ionic conductivity and suppresses hydrogen sulfide. Compositions having less than 10 wt % argyrodite have low $Li^+$ conductivity. Sulfide glasses and glass ceramics may also be used.

An electronic conductivity additive is useful for active materials that, like NMC, have low electronic conductivity. Carbon black is an example of one such additive, but other carbon-based additives including other carbon blacks, activated carbons, carbon fibers, graphites, graphenes, and carbon nanotubes (CNTs) may be used. Below 1 wt % may not be enough to improve electronic conductivity while greater than 5% leads to decrease in energy density and disturbing active material-argyrodite contacts.

Any appropriate organic phase may be used as described above. Below 1 wt % may not be enough to achieve desired mechanical properties while greater than 5% can lead to decrease in energy density and disturbing active material-inorganic conductor-carbon contacts. In some embodiments, PVDF is used with or without a non-polar polymer.

For anode compositions, the table below gives examples of compositions.

pliant solid electrolyte composition as described above operatively associated with the anode and cathode. The batteries may include a separator for physically separating the anode and cathode; this may be the solid electrolyte composition.

Examples of suitable anodes include but are not limited to anodes formed of lithium metal, lithium alloys, sodium metal, sodium alloys, carbonaceous materials such as graphite, and combinations thereof. Examples of suitable cathodes include, but are not limited to cathodes formed of transition metal oxides, doped transition metal oxides, metal phosphates, metal sulfides, lithium iron phosphate, sulfur and combinations thereof. In some embodiments, the cathode may be a sulfur cathode.

In an alkali metal-air battery such as a lithium-air battery, sodium-air battery, or potassium-air battery, the cathode may be permeable to oxygen (e.g., mesoporous carbon, porous aluminum, etc.), and the cathode may optionally contain a metal catalyst (e.g., manganese, cobalt, ruthenium, platinum, or silver catalysts, or combinations thereof) incorporated therein to enhance the reduction reactions occurring with lithium ion and oxygen at the cathode.

| Constituent | Primary active material | Secondary active material | Inorganic conductor | Electronic conductivity additive | Organic phase |
|---|---|---|---|---|---|
| Examples | Si-containing active materials Elemental Si Si-carbon composite materials Sialloys, e.g., Si alloyed with one or more of Al, Zn, Fe, Mn, Cr, Co, Ni, Cu, Ti, Mg, Sn, Ge | Graphite | Agyrodites (e.g., $Li_6PS_5Cl$, $Li_{5.6}PS_{4.6}Cl_{1.4}$, $Li_{5.4}M_{0.1}PS_{4.6}Cl_{1.4}$, $Li_{5.8}M_{0.1}PS_5Cl$, $Na_{5.8}M_{0.1}PS_5Cl$ Sulfide glasses or glass ceramics (e.g., $75Li_2S \cdot 25P_2S_5$) | Carbon-based Activated carbons CNTs Graphene Carbon fibers Carbon black (e.g., Super C) | PVDF-PS copolymer PVDF:PVDF-PS copolymer SEBS:PVDF-PS copolymer SEBS SBR SIS NBR |
| Wt % range | Si is 15%-50% | 5%-40% | 10%-50% | 0%-5% | 1%-5% |

Hybrid anodes where both Si and graphite are utilized as active materials deliver higher ICE with increasing graphite content meaning that ICE of the anode can match ICE of the cathode by adjusting Si/graphite ratio thus preventing irreversible capacity loss on the first cycle. ICE can vary with processing, allowing for a relatively wide range of graphite content depending on the particular anode and its processing. In addition, graphite improves electronic conductivity and may help densification of the anode.

Any appropriate inorganic conductor may be used as described above with respect to cathodes.

A high-surface-area electronic conductivity additive (e.g., carbon black) may be used some embodiments. Si has low electronic conductivity and such additives can be helpful in addition to graphite (which is a great electronic conductor but has low surface area). However, electronic conductivity of Si alloys can be reasonably high making usage of the additives unnecessary in some embodiments. Other high-surface-area carbons (carbon blacks, activated carbons, graphenes, carbon nanotubes) can also be used instead of Super C.

Any appropriate organic phase may be used. In some embodiments, PVDF is used.

Provided herein are alkali metal batteries and alkali metal ion batteries that include an anode, a cathode, and a com- In some embodiments, lithium-sulfur cells are provided, including lithium metal anodes and sulfur-containing cathodes. In some embodiments, the solid-state composite electrolytes described herein uniquely enable both a lithium metal anode, by preventing dendrite formation, and sulfur cathodes, by not dissolving polysulfide intermediates that are formed at the cathode during discharge.

A separator formed from any suitable material permeable to ionic flow can also be included to keep the anode and cathode from directly electrically contacting one another. However, as the electrolyte compositions described herein are solid compositions, they can serve as separators, particularly when they are in the form of a film.

In some embodiments, the solid electrolyte compositions serve as electrolytes between anodes and cathodes in alkali ion batteries that rely on intercalation of the alkali ion during cycling.

As described above, in some embodiments, the solid composite compositions may be incorporated into an electrode of a battery. The electrolyte may be a compliant solid electrolyte as described above or any other appropriate electrolyte, including liquid electrolyte.

In some embodiments, a battery includes an electrode/electrolyte bilayer, with each layer incorporating the ionically conductive solid-state composite materials described herein.

FIG. 1A shows an example of a schematic of a cell according to certain embodiments. The cell includes a negative current collector 102, an anode 104, an electrolyte/separator 106, a cathode 108, and a positive current collector 110. The negative current collector 102 and the positive current collector 110 may be any appropriate electronically conductive material, such as copper, steel, gold, platinum, aluminum, and nickel. In some embodiments, the negative current collector 102 is copper and the positive current collector 110 is aluminum. The current collectors may be in any appropriate form, such as a sheet, foil, a mesh, or a foam. According to various embodiments, one or more of the anode 104, the cathode 108, and the electrolyte/separator 106 is a solid-state composite including an organic phase and sulfide conductor as described above. In some embodiments, two or more of the anode 104, the cathode 108, and the electrolyte 106 is solid-state composite including an organic phase and sulfide conductor, as described above.

In some embodiments, a current collector is a porous body that can be embedded in the corresponding electrode. For example, it may be a mesh. Electrodes that include hydrophobic polymers may not adhere well to current collectors in the form of foils; however meshes provide good mechanical contact. In some embodiments, two composite films as described herein may be pressed against a mesh current collector to form an embedded current collector in an electrode. In some embodiments, a hydrophilic polymer that provides good adhesion is used.

Figure 1B:
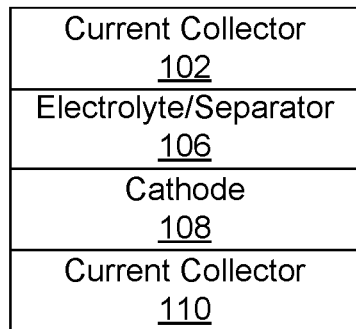
Figure 1C:
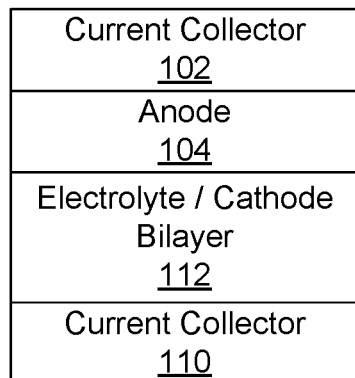

FIG. 1B shows an example of schematic of a lithium metal cell as-assembled according to certain embodiments of the invention. The cell as-assembled includes a negative current collector 102, an electrolyte/separator 106, a cathode 108, and a positive current collector 110. Lithium metal is generated on first charge and plates on the negative current collector 102 to form the anode. One or both of the electrolyte 106 and the cathode 108 may be a composite material as described above. In some embodiments, the cathode 108 and the electrolyte 306 together form an electrode/electrolyte bilayer. FIG. 1C shows an example of a schematic of a cell according to certain embodiments of the invention. The cell includes a negative current collector 102, an anode 104, a cathode/electrolyte bilayer 112, and a positive current collector 110. Each layer in a bilayer may include a sulfidic conductor. Such a bilayer may be prepared, for example, by preparing an electrolyte slurry and depositing it on an electrode layer.

All components of the battery can be included in or packaged in a suitable rigid or flexible container with external leads or contacts for establishing an electrical connection to the anode and cathode, in accordance with known techniques.

In the description above and in the claims, numerical ranges are inclusive of the end points of the range. For example, "y is a number between 0 and 0.8" includes 0 and 0.8. Similarly, ranges represented by a dash are inclusive of the end points of the ranges.

The invention claimed is:

1. A composite comprising:
   inorganic ionically conductive particles; and
   an organic phase comprising a polymer binder having a molecular weight of at least 30 kg/mol, wherein the polymer binder comprises a backbone modified with functional groups, the functional groups being in side chains off the backbone and the functional groups being between 0.1 and 5 wt. % of the polymer binder, wherein the polymer binder comprises styrene-ethylene-butylene-styrene (SEBS) modified with furfurylamine (SEBS-gFA).

2. The composite of claim 1, wherein the organic phase comprises a mixture of unmodified SEBS and SEB-gFA.

3. The composite of claim 1, wherein the inorganic ionically conductive particles are argyrodites.

4. The composite of claim 1, wherein the inorganic ionically conductive particles are sulfide glass particles.

5. The composite of claim 1, wherein the composite has an elongation at break of at least 10%.

6. A slurry comprising:
   a solvent;
   a polymer binder having a molecular weight of at least 30 kg/mol dissolved in the solvent,
   the polymer binder comprises a backbone modified with functional groups in side chains off the backbone and the functional groups being between 0.1 and 5 wt. % of the polymer binder; and
   ionically conductive sulfidic particles suspended in the solvent,
   wherein the polymer binder comprises styrene-ethylene-butylene-styrene (SEBS) modified with furfurylamine (SEBS-gFA).

7. The slurry of claim 6, wherein the slurry comprises a mixture of unmodified SEBS and SEBS-gFA.

8. The slurry of claim 6, wherein the solvent is at least 50% wt of the slurry.

9. The composite of claim 3, wherein the argyrodites comprise argyrodites with the formula: $Li_{7-x}PS_{6-x}X_x$ (X=Cl, Br, I, and 0<x<2).

10. The composite of claim 3, wherein the argyrodites comprise argyrodites doped with a thiophilic metal selected from manganese (Mn), iron (Fe), cobalt (Co), nickel (Ni), copper (Cu), zinc (Zn), and mercury (Hg).

11. The composite of claim 3, wherein the argyrodites comprises argyrodites of the formula: $A_{7-x-(z*m)}M^z{}_mPS_{6-x}Hal_x$ wherein A is an alkali metal; M is a metal selected from manganese (Mn), iron (Fe), cobalt (Co), nickel (Ni), copper (Cu), zinc (Zn), and mercury (Hg); Hal is selected from chlorine (Cl), bromine (Br), and iodine (I); z is the oxidation state of the metal; $0 \leq x \leq 2$; and $0 \leq m < (7-x)/z$.

12. The composite of claim 1, wherein the composite is an electrolyte separator in a battery.

13. The composite of claim 1, wherein the composite further comprises an electrode active material.

14. The composite of claim 1, wherein the composite further comprises a silicon-containing material.

15. The composite of claim 14, wherein the silicon-containing material is elemental silicon (Si) or a silicon-carbon composite material.

16. The composite of claim 14, wherein the silicon-containing material is a silicon alloy.

17. The composite of claim 14, wherein the composite is an electrode layer in a battery.

18. The composite of claim 1, wherein the composite has an ionic conductivity of at least 0.6 mS·cm$^{-1}$ at 25° C.

19. The composite of claim 1, wherein the composite has an elongation at break of at least 5%.

20. The composite of claim 1, wherein the composite has an ionic conductivity of at least 0.2 mS·cm$^{-1}$ at 25° C.

21. The composite of claim 19, wherein the composition has an elongation at break of at least 15%.

22. The composite of claim 1, wherein the composition has an elongation at break of at least 20%.

23. The composite of claim 1, wherein the weight percentage of the inorganic ionically conductive particles in the composite is no more than 90%.

24. The composite of claim 1, wherein the organic phase comprises a mixture of unmodified SEBS and SEB-gFA.

25. The slurry of claim 6, wherein the solvent has a polarity index of less than 3.5.

26. The slurry of claim 6, wherein the solvent is halogenated and has a polarity index of higher than 3.5.

* * * * *